United States Patent
Byun et al.

(10) Patent No.: US 10,271,328 B2
(45) Date of Patent: Apr. 23, 2019

(54) METHOD FOR ARRANGING FRAME STRUCTURE OF FLEXIBLE SHORT TTI ACCORDING TO CHANGE IN CONTROL REGION, AND DEVICE USING SAME

(71) Applicant: LG ELECTRONICS INC., Seoul (KR)

(72) Inventors: Ilmu Byun, Seoul (KR); Heejeong Cho, Seoul (KR); Genebeck Hahn, Seoul (KR); Eunjong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 64 days.

(21) Appl. No.: 15/550,710

(22) PCT Filed: Oct. 14, 2015

(86) PCT No.: PCT/KR2015/010833
§ 371 (c)(1),
(2) Date: Aug. 11, 2017

(87) PCT Pub. No.: WO2016/143967
PCT Pub. Date: Sep. 15, 2016

(65) Prior Publication Data
US 2018/0042013 A1    Feb. 8, 2018

Related U.S. Application Data

(60) Provisional application No. 62/132,456, filed on Mar. 12, 2015.

(51) Int. Cl.
*H04L 5/00*    (2006.01)
*H04J 11/00*    (2006.01)
(Continued)

(52) U.S. Cl.
CPC ......... *H04W 72/0446* (2013.01); *H04J 11/00* (2013.01); *H04L 5/0048* (2013.01);
(Continued)

(58) Field of Classification Search
CPC .. H04J 11/00; H04L 27/2601; H04L 27/2602; H04L 5/0048; H04W 72/042; H04W 72/0446; H04W 72/1289
See application file for complete search history.

(56) References Cited

U.S. PATENT DOCUMENTS

| | | | |
|---|---|---|---|
| 2003/0169709 A1* | 9/2003 | Oki | H04B 7/2656 370/335 |
| 2009/0175245 A1* | 7/2009 | Harada | H04L 1/0007 370/336 |

(Continued)

OTHER PUBLICATIONS

3GPP TS 36.211 V12.3.0 (Sep. 2014), Technical Specification, 3rd Generation Partnership Project; Technical Specification Group Radio Access Network; Evolved Universal Terrestrial Radio Access (E-UTRA); Physical channels and modulation (Release 12), 124 pgs.

*Primary Examiner* — Kashif Siddiqui
(74) *Attorney, Agent, or Firm* — Birch, Stewart, Kolasch & Birch, LLP

(57) ABSTRACT

Provided are a method and a device for arranging a subframe structure of a short TTI according to the change in a control region in a wireless communication system. Specifically, a plurality of first downlink channels received during an sTTI and a second downlink channel received during a TTI are received. The number of symbols used for each of the plurality of first downlink channels is determined by a format indicator channel included in the first symbol of a subframe. Further, the plurality of first downlink channels are demodulated by using scheduling information included in each of the plurality of first downlink channels, and the (Continued)

second downlink channel is demodulated by using scheduling information included in a control region indicated by the format indicator channel.

11 Claims, 23 Drawing Sheets

(51) Int. Cl.
    *H04L 27/26*     (2006.01)
    *H04W 72/04*     (2009.01)
    *H04W 72/12*     (2009.01)

(52) U.S. Cl.
    CPC ...... *H04L 27/2601* (2013.01); *H04L 27/2602* (2013.01); *H04W 72/042* (2013.01); *H04W 72/1289* (2013.01)

(56)     References Cited

U.S. PATENT DOCUMENTS

2009/0259909 A1* 10/2009 Luo ................ H04L 1/0038
                                                                                   714/748
2012/0213311 A1* 8/2012 Park ................ H04J 13/0048
                                                                                    13/48
2013/0223402 A1* 8/2013 Feng ................ H04L 5/0007
                                                                                   370/330

* cited by examiner x=7, 8, 11, 13
y=9, 10, 12, 14

METHOD FOR ARRANGING FRAME STRUCTURE OF FLEXIBLE SHORT TTI ACCORDING TO CHANGE IN CONTROL REGION, AND DEVICE USING SAME

CROSS REFERENCE TO RELATED APPLICATIONS

This application is the National Phase of PCT International Application No. PCT/KR2015/010833, filed on Oct. 14, 2015, which claims priority under 35 U.S.C. 119(e) to U.S. Provisional Application No. 62/132,456, filed on Mar. 12, 2015, all of which are hereby expressly incorporated by reference into the present application.

BACKGROUND OF THE INVENTION

Field of the Invention

The present specification relates to wireless communication, and more particularly, to a method of arranging a frame structure of a flexible short transmission time interval (TTI) based on a change in a control region in a wireless communication system, and a device using the method.

Related Art

A wireless communication system is widely deployed to provide various types of communication services, such as voice and data. An object of a wireless communication system is to enable a plurality of terminals to perform reliable communication regardless of their locations and mobility.

In general, a wireless communication system is a multiple access system capable of supporting communication with a plurality of terminals by sharing available radio resources. Examples of radio resources include time, a frequency, code, transmission power and so on. Examples of a multiple access system includes a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system and so on.

A base station (BS) properly allocates radio resources to each piece of user equipment (UE) within a cell through scheduling. The UE may transmit control information or user data to the BS using the allocated radio resources. In this case, a method for transmitting control information and a method for transmitting user data may be different. Furthermore, a method for allocating radio resources for control information and a method for allocating radio resources for user data may be different. Accordingly, radio resources for control information and radio resources for user data may be different. A BS may differently manage radio resources reserved for control information and radio resources reserved for user data.

In a 3GPP LTE system, the time taken for control information or data user to be transmitted on a single subframe is a transmission time interval (TTI). In general, the length of a single subframe is 1 ms. However, a next-generation wireless communication system for responding to a change of a higher data rate and a faster channel environment attempts to achieve latency of 1 ms on a user plane. That is, a TTI having a length of 1 ms has a structure not suitable for low latency requirements in a next-generation wireless communication system. Accordingly, there is a need for a method for disposing a radio resource structure for satisfying lower latency by controlling a short TTI subdivided from the existing TTI.

SUMMARY OF THE INVENTION

The present specification provides a method of arranging a subframe structure of a flexible short transmission time interval (TTI) based on a change in a control region, and a device using the method. In addition, the present specification also provides a method of arranging a user equipment (UE)-specific reference signal in accordance with a flexible short TTI based on a change in a control region, and a device using the method.

The present specification proposes a method of performing communication by using a plurality of control channels and a plurality of data channels delivered by means of a plurality of symbols in a wireless communication system.

The terms are summarized as follows. An sTTI is in the existing III and corresponds to a time interval temporally shorter than the existing TTI. A $1^{st}$ downlink channel includes sPDSCH received during the sTTI and sPDCCH for scheduling the sPDSCH. A $2^{nd}$ downlink channel corresponds to the existing PDSCH received during the existing TTI. Channel demodulation corresponds to channel decoding.

First, a plurality of $1^{st}$ downlink channels included in a subframe corresponding to one existing TTI and received during the sTTI and a $2^{nd}$ downlink channel received during the existing TTI are received. The number of symbols used for each of the plurality of $1^{st}$ downlink channels is determined on the basis of a format indicator channel included in a $1^{st}$ symbol of the subframe. Herein, the format indicator channel corresponds to a PCFICH. The $1^{st}$ symbol of the subframe is included in a control region of the existing TTI, and the $1^{st}$ symbol is when the PCFICH is arranged first in the control region of the existing TTI. Since a size of the control region of the existing TTI can be known by demodulating the PCFICH, the number of symbols used for each of the plurality of $1^{st}$ downlink channels can also be known. In addition, the plurality of $1^{st}$ downlink channels are sequentially received. That is, they are received in order of a $1^{st}$ sTTI, a $2^{nd}$ sTTI, and a $3^{rd}$ sTTI.

A $1^{st}$ symbol of each of the plurality of $1^{st}$ downlink channels corresponds to a special symbol. A $1^{st}$ downlink channel which is first received among the plurality of $1^{st}$ downlink channels is received during the $1^{st}$ sTTI. The $1^{st}$ sTTI is divided into a case of having a special symbol and a case of not having the special symbol. In case of not having the special symbol, scheduling information for the $1^{st}$ downlink channel which is first received among the plurality of $1^{st}$ downlink channels is included in the control region of the existing TTI. Otherwise, in case of having the special symbol, the scheduling information included in each of the plurality of $1^{st}$ downlink channels is included in the $1^{st}$ symbol, i.e., the special symbol, of the plurality of $1^{st}$ downlink channels.

The sPDSCH and the existing PDSCH are received in different frequency bands. That is, the sTTI represents a radio resource structure by being divided in terms of not only time but also frequency.

Next, the plurality of $1^{st}$ downlink channels are demodulated by using the scheduling information included in each of the plurality of $1^{st}$ downlink channels. The scheduling information included in each of the plurality of $1^{st}$ downlink channels corresponds to control information for scheduling the sPDSCH in each sTTI. The control information is included in the sPDCCH in each sTTI. In addition, the $2^{nd}$ downlink channel is demodulated by using the scheduling information included in the control region indicated by the format indicator channel. The control region indicated by the format indicator channel corresponds to the control region of the existing III, and the scheduling information included in the control region is included in the existing PDCCH. That is, this corresponds to demodulation of the existing PDSCH by using the existing PDCCH.

At least one UE-specific RS is included in only one symbol of each of the plurality of $1^{st}$ downlink channels. The subframe includes a cell-specific RS. In the present specification, the arrangement is changed by minimizing a position of the UE-specific RS in accordance with the sTTI while maintaining a position of the cell-specific RS.

The UE-specific RS includes a $1^{st}$ reference signal (RS) sequence and a $2^{nd}$ RS sequence. Herein, the $1^{st}$ RS sequence is used for a $1^{st}$ antenna, and a $1^{st}$ orthogonal sequence is applied. The $2^{nd}$ RS sequence is used for a $2^{nd}$ antenna, and a $2^{nd}$ orthogonal sequence and is applied. The $1^{st}$ antenna and the $2^{nd}$ antenna may be distinguished by applying the $1^{st}$ orthogonal sequence and the $2^{nd}$ orthogonal sequence on a frequency axis. The $1^{st}$ orthogonal sequence and the $2^{nd}$ orthogonal sequence may be selected from among mutually orthogonal walsh codes.

It is characterized that the aforementioned symbol is an OFDM symbol or an SC-FDMA symbol.

It is possible to minimize an effect on a user equipment (UE) in a situation where a short TTI (sTTI) and the existing TTI co-exist. Further, since the sTTI ensures a greater amount of sPDSCHs than before, an overhead generated in a control signal and a reference signal with the introduction of the sTTI can be decreased. In addition, single-layer beamforming and multi-layer beamforming can be performed even in the sTTI by proposing a UE-specific reference signal that can be used when the sTTI is introduced.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi). IEEE 802.16 (WiMAX), IEEE 802-20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE. However, technical features of the present invention are not limited thereto.

Figure 1:
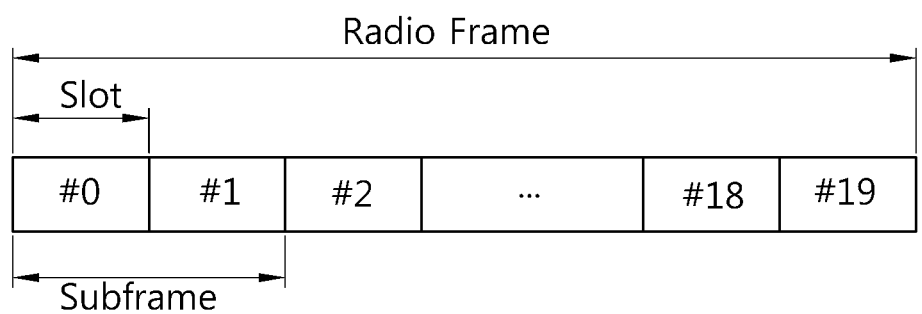
FIG. 1 shows a structure of a radio frame in 3GPP LTE.

FIG. 1 shows a structure of a radio frame in 3GPP LTE.

Referring to FIG. 1, the radio frame consists of 10 subframes. One subframe consists of 2 slots. The slots in the radio frame are numbered from slot number 0 to 19. A time required for transmitting one subframe is defined as a transmission time interval (TTI). The TTI is a unit of scheduling for transmitting a data. For example, one subframe may have a length of 1 millisecond (ms), and one slot may have a length of 0.5 ms.

The structure of the radio frame is for exemplary purposes only, and the number of subframes included in the radio frame or the number of slots included in the subframe and the number of SC-FDMA symbols included in the slot can change variously.

Figure 2:
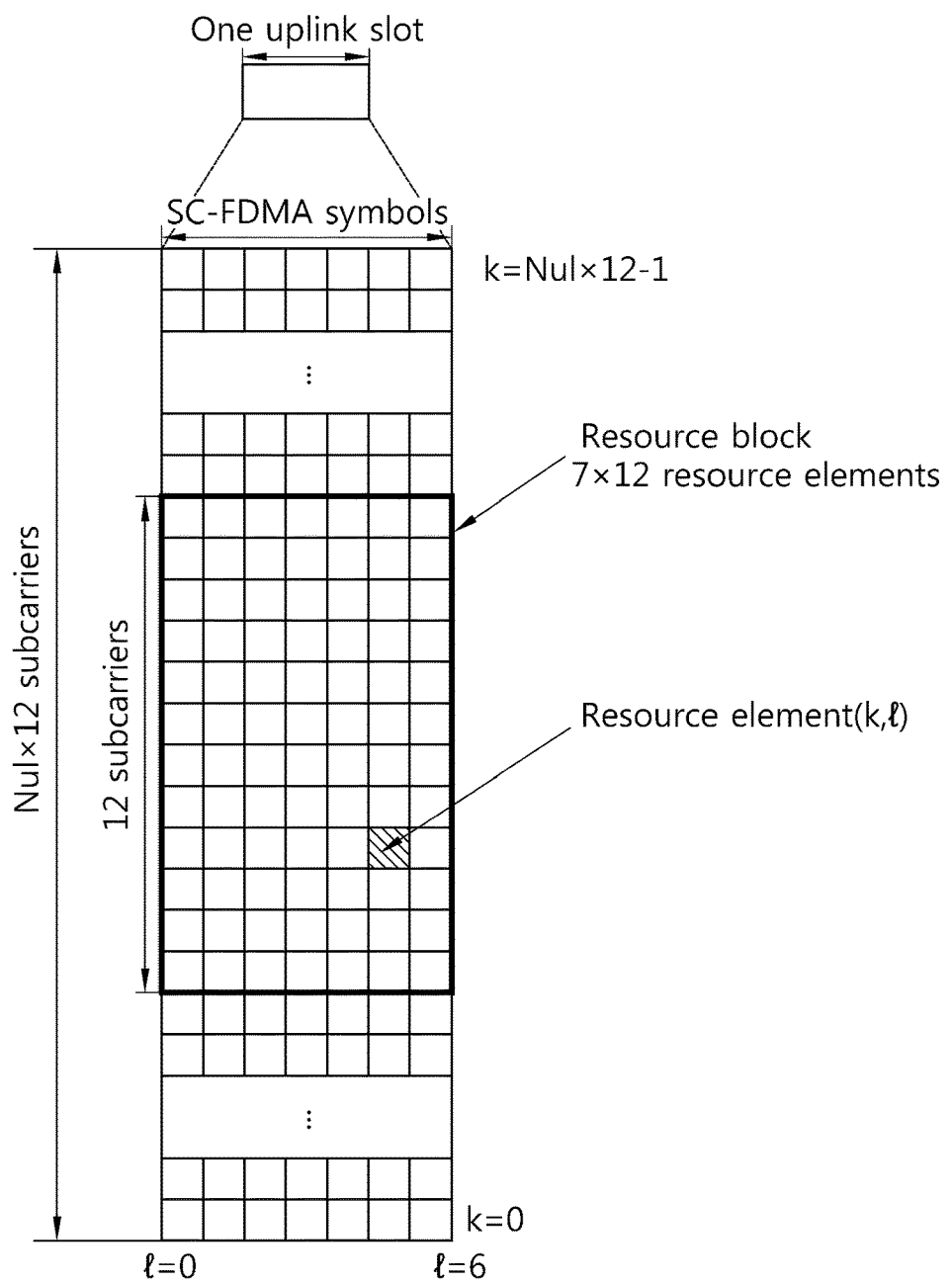
FIG. 2 is a diagram showing an example of a resource grid for one uplink slot in 3GPP LTE.

FIG. 2 is a diagram showing an example of a resource grid for one uplink slot in 3GPP LTE.

Referring to FIG. 2, The UL slot includes a plurality of SC-FDMA symbols in a time domain and includes a plurality of $N^{UL}$ RBs in a frequency domain. It is described that the SC-FDMA symbols are for representing one symbol period, and the SC-FDMA symbols can be OFDM symbols or symbol period according to the system. The RBs are a unit of resource allocation in the frequency domain and include 12 subcarriers. The number $N^{UL}$ of RBs included in the UL slot depends on a UL bandwidth defined in a cell. The UL bandwidth is system information. The UE may know $N^{UL}$ by acquiring the system information.

Each element on the resource grid is referred to as a resource element. One RB includes 12×7 resource elements. The resource element on the resource grid can be identified by an index pair (k, l) within the slot. Herein, k (k=0, ..., $N^{UL}$×12-1) denotes a subcarrier index in the frequency domain, and l (l=0, ..., 6) denotes an SC-FDMA symbol index in the time domain.

Although it is described herein that one RB includes 7×12 resource elements consisting of 7 SC-FDMA symbols in the time domain and 12 subcarriers in the frequency domain for example, the number of SC-FDMA symbols and the number of subcarriers in the RB are not limited thereto. Thus, the number of subcarriers or the number of SC-FDMA symbols included in the RB may change variously. The number of SC-FDMA symbols may change depending on a cyclic prefix (CP) length. For example, when using a normal CP, the number of SC-FDMA symbols included in one slot is 7, and when using an extended CP, the number of SC-FDMA symbols included in one slot is 6.

In 3GPP LTE of FIG. 2, a resource grid for a single uplink slot may also be applied to a resource grid for a downlink slot. In this case, the downlink slot includes a plurality of orthogonal frequency division multiplexing (OFDM) symbols in a time domain.

Figure 3:
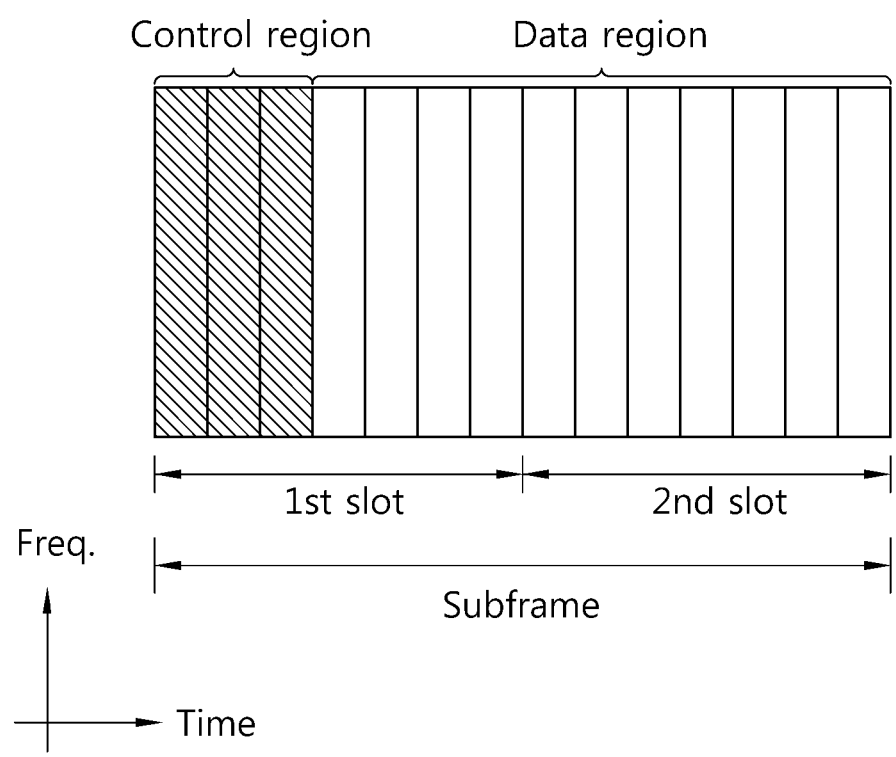
FIG. 3 shows an example of a structure of a downlink subframe in 3GPP LTE.

FIG. 3 shows an example of a structure of a downlink subframe in 3GPP LTE.

Referring to FIG. 3, a downlink subframe includes two contiguous slots. In the first slot of the downlink subframe, a maximum of the former 3 OFDM symbols become a control region to which a physical downlink control channel (PDCCH) is allocated, and the remaining OFDM symbols become a data region to which physical downlink shared channels (PDSCHs) are allocated. Control channels, such as a physical control format indicator channel (PCFICH) and a physical hybrid-ARQ indicator channel (PHICH), in addition to a PDCCH may be allocated to the control region. In this case, the inclusion of the 3 OFDM symbols in the control region is only an example. The number of OFDM symbols included in the control region of a subframe may be aware through a PCFICH. A PHICH carries hybrid automatic repeat request (HARQ) acknowledgement (ACK)/not-acknowledgement (NACK) information as a response to uplink data transmission.

A PDCCH may carry a downlink grant that provides notification of the resource allocation of downlink transmission on a PDSCH. UE may read downlink user data transmitted through a PDSCH by decoding control information transmitted through the PDCCH. Furthermore, the PDCCH may carry control information, used for physical uplink shared channel (PUSCH) scheduling, to the UE. The control information used for PUSCH scheduling is an uplink grant that provides notification of the resource allocation of uplink transmission.

A control region consists of an aggregation of a plurality of control channel elements (CCEs). A PDCCH is transmitted on an aggregation of one or some contiguous CCEs. A CCE corresponds to a plurality of resource element groups. A resource element group is used to define the mapping of a control channel to a resource element. In a downlink subframe, if a total number of CCEs is $N_{cce}$, CCE indices of 0 to $N_{cce}$,k-1 are assigned to CCEs. A total number of CCEs within a subframe may also be different in each subframe because the number of OFDM symbols included in a control region within a subframe may be different in each subframe.

Hereinafter, a subframe consisting of N (>=1) OFDM symbols is defined, and a specific radio frame structure in which M (>=0) subframes and P (>=0) special symbols (s-symbols) for a control physical signal or a control information transport channel are bundled is described. This shows a specific radio frame structure designed differently from the example in which 14 contiguous OFDM symbols illustrated in FIG. 1 become one subframe and 10 subframes have one radio frame structure.

Data, a control physical signal, and control information may be transmitted in a subframe, and a control physical signal and control information other than data may be transmitted in a special symbol. Such a time section resource transmission structure may be designated in a UE unit or may be designated so that it is in common applied to all of pieces of UE in a cell or system. At the same time, a transmission structure may be limitedly designated so that it is applied depending on a time or frequency band (subband). If the time section resource transmission structure is designated in a UE unit, UE may be notified of such designation using a UE-specific downlink physical control channel or UE-specific RRC signaling. In the case of the UE-common designation of a BS or network, UE may be notified of the designation using a UE-common downlink physical control channel or UE-common RRC signaling as system information.

Figure 4:
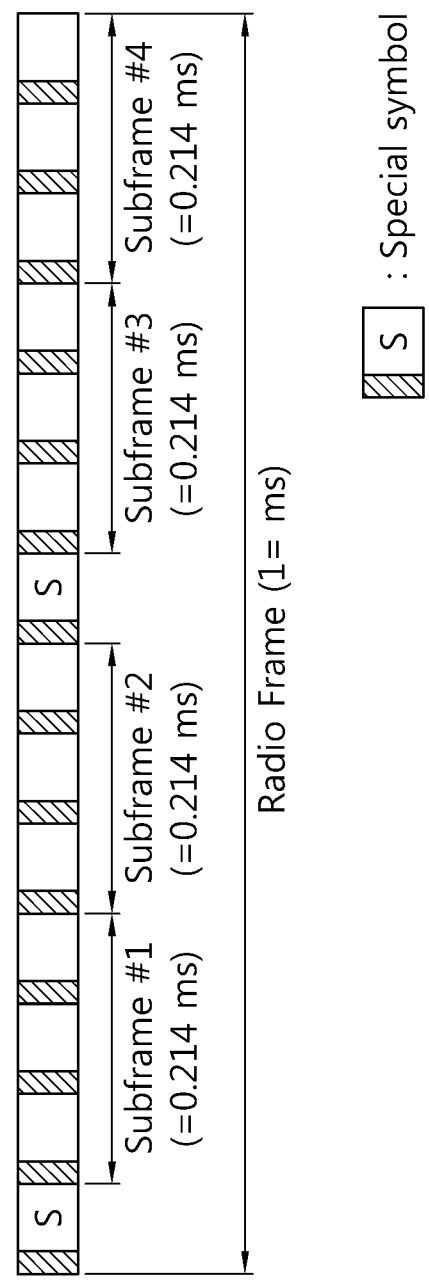
FIG. 4 shows the structure of a radio frame including subframes and special symbols.

FIG. 4 shows the structure of a radio frame including subframes and special symbols.

FIG. 4 illustrates a time section transmission resource structure in which 3 OFDM symbols (N=3) form a single subframe and four subframes (M=4) and two special symbols (P=2) define a radio frame of 1 ms in length. The length of each subframe is 0.214 ms.

In this case, special symbols within the radio frame may be disposed at equal distances, may be disposed only at a specific location, or may be irregularly disposed. If the role of special symbols is for measurement, detection or the transfer of information, the special symbols may be disposed at equal distances. Special symbols may be irregularly disposed depending on the number of pieces of UE within a cell or a channel characteristic. Some examples in which a special symbol is disposed are described below.

Figure 5:
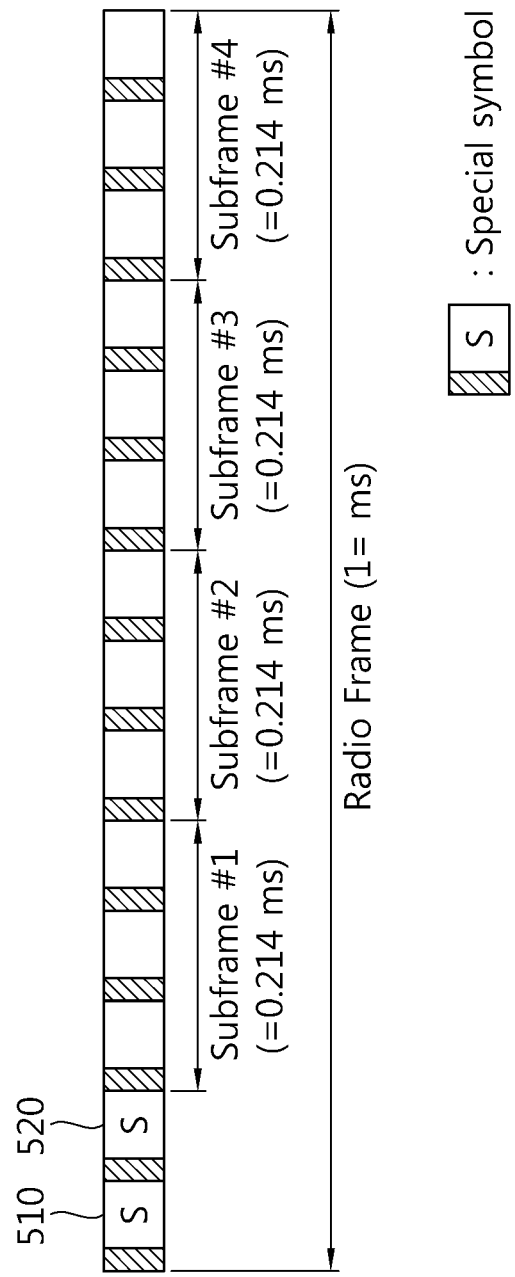
FIG. 5 shows an example of the structure of a radio frame in which special symbols have been contiguously disposed at the front part of the radio frame.
Figure 6:
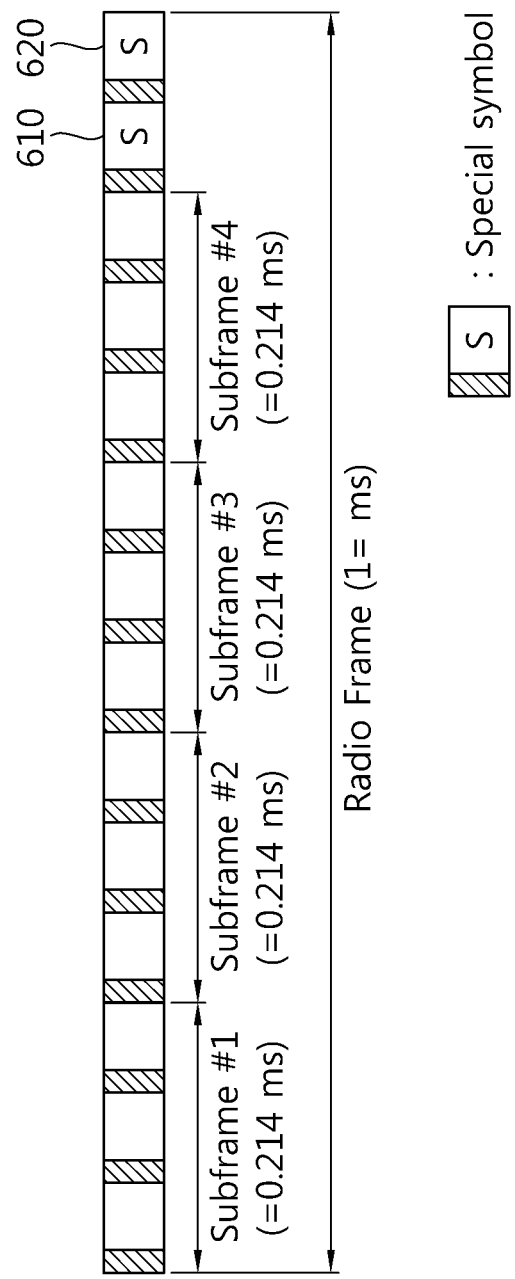
FIG. 6 shows an example of the structure of a radio frame in which special symbols have been contiguously disposed at the back part of the radio frame.

FIG. 5 shows an example of the structure of a radio frame in which special symbols have been contiguously disposed at the front part of the radio frame. FIG. 6 shows an example of the structure of a radio frame in which special symbols have been contiguously disposed at the back part of the radio frame. FIG. 5 shows a transmission resource structure in which special symbols 510 and 520 are contiguously disposed in symbols that are temporally the first two on the radio frame. FIG. 6 shows a transmission resource structure in which special symbols are contiguously disposed in symbols 610 and 620 that are temporally the last two on the radio frame.

In this specification, in the time section transmission resource structure, the locations of special symbols in each radio frame may be different in a radio frame unit or a plurality of radio frame units. If one or a plurality of special symbol is periodically disposed in a radio frame unit, the locations of special symbol in a corresponding cycle may be patterned, and an index may be assigned to the pattern. Alternatively, a BS may notify UE of control information about a bitmap form in a radio frame unit through RRC signaling, may transfer the control information to the UE through a downlink physical data channel using an MAC control element (CE), or may transfer the control information to the UE through a downlink physical control channel.

In this specification, the time section transmission resource structure is specified in a UE unit in frequency division duplex (FDD). Alternatively, the time section transmission resource structure may be applied to both a downlink transmission band and an uplink transmission band or only one of a downlink transmission band and an uplink transmission band with respect to all of pieces of UE within a cell.

Likewise, the time section transmission resource structure may be specified in a UE unit in time division duplex (TDD) or full duplex using specific radio resources for uplink/downlink transmission. Alternatively, the time section transmission resource structure may be applied to both downlink transmission time resources and uplink transmission time resources or only one of downlink transmission time resources and uplink transmission time resources with respect to all of pieces of UE within a cell. From a viewpoint of an uplink/downlink time section resource configuration of TDD, a method for designating downlink transmission resources and uplink transmission resources in a radio frame unit may be applied to the time section transmission resource structure. Alternatively, a method for designating downlink transmission resources and uplink transmission resources in a subframe unit within a radio frame may be applied to the time section transmission resource structure.

That is, in this specification, the time section transmission resource structure is provided on the basis that it may be independently applied to uplink/downlink transmission resources using parameters independently on a physical control channel or RRC signaling. Furthermore, if only a method for simultaneously applying uplink transmission and downlink transmission is used depending on a method for applying a system, the time section transmission resource structure may be applied in common simultaneously using a single parameter on a physical control channel or RRC signaling.

In this specification, the time section transmission resource structure defines a special symbol within a radio frame independently of a subframe. In this case, the special symbol may be used to transmit special cell-common or UE-specific control information. Furthermore, the special symbol may be used to transmit a special cell-common or UE-specific physical signal (e.g., a pilot, a reference signal or a synchronization signal) for the purpose of the measurement or detection of UE. Possible examples of a signal or control information that is transmitted in the special symbol are described below in the case of downlink and uplink.

1. Downlink (1) Transmission of Physical Downlink Control Channel (PDCCH)

A BS transmits a PDCCH, including UE-common control information or pieces of UE-specific control information required to be transmitted from the BS or a specific network radio node to UE through downlink, to the UE through a special symbol. The UE may receive a physical channel, that is, the object of the special symbol. In this case, the PDCCH is basically designed on a frequency resource on a single special symbol, but may be designed on a plurality of symbols resources and frequency resources if a plurality of special symbols is used.

(2) Transmission of Downlink Synchronization Signal

A BS may transmit a downlink synchronization physical signal transmitted so as to obtain the downlink reception synchronization of UE through one or more special symbols. For example, in 3GPP LTE, a primary synchronization signal (PSS) and a secondary synchronization signal (SSS) become the object of a downlink synchronization physical signal. If such a method is applied, the location of a special symbol used to the corresponding object within a specific defined radio frame on time section resources may be designated in a UE-common manner. Furthermore, a BS and UE permanently designate the location of a special symbol without separate signaling.

(3) Transmission of Downlink Channel Measurement Pilot (or Reference Signal)

For the purpose of system downlink control including the support of a determination of the time-frequency resource configuration and transmission method of a packet scheduler adaptive to a radio channel on a radio packet transmission system, a downlink channel measurement pilot is transmitted through one or more special symbols defined separately from a UE data channel transmission time section. Furthermore, UE performs radio channel measurement using a corresponding pilot through a corresponding special symbol. This method may be used as a method for preventing the deterioration of data transmission performance generated because resources for transmitting the existing data channel are excessively used to transmit a pilot signal if a technology in which downlink transmission is performed using a large number of transmission antennas, such as massive MIMO, is used in a mobile communication system. In this case, the massive MIMO may be defined as a transmission method using 16 or more transmission antennas. It is assumed that a downlink channel measurement pilot is transmitted using a plurality of special symbols. In this case, in addition to the multiplexing method of a multiple pilot resource pattern using a basic TDM, FDM method, the multiplexing method of a multiple pilot resource pattern using a CDM method through the application of time section orthogonal code or frequency section orthogonal code may be applied.

(4) Use of Interference Signal Measurement by UE

An operation of allowing UE to measure a downlink reception interference signal of another network radio node or UE other than a network radio node (or BS) that provides service through one or more special symbols may be defined. As a first example, a specific network radio node (or BS) excludes the transmission of a radio signal in all of subcarrier resources or some designated subcarrier resources included in a special symbol on time section transmission resources that are to be used for transmission by the specific network radio node (or BS). Furthermore, UE that is provided with service from a corresponding network radio node may use a method for receiving a specific signal (it may be defined as a pilot or reference signal) of adjacent network radio nodes (or BSs) through the corresponding symbol. In this case, a special symbol transmission signal on a plurality of network radio nodes may be defined as a pilot (or reference signal) for downlink channel measurement. Furthermore, in order to exclude the transmission of a radio signal, all of subcarrier resources within a specific pilot pattern or a corresponding symbol may be specially defined as a null power pilot. As a second example, an operation for the UE interference measurement of the first example may be applied in a situation in which a serving network radio node also transmits a signal by applying a specific resources pattern of a specific pilot (or reference signal) of a specific channel may also be applied.

(5) Transmission of Downlink ACK/NACK Signal for Uplink Data

A downlink ACK/NACK signal for transmitting uplink data is defined as a physical channel on a specific special symbol. A network radio node (or a BS) that receives the uplink data transmits the downlink ACK/NACK signal through the corresponding special symbol. A correction mechanism operation for detecting an error of a system physical layer may be defined so that UE that transmits the uplink data receives the downlink ACK/NACK signal through the corresponding special symbol.

(6) Transmission of Downlink Massive MIMO Beam Scanning Signal

In this specification, a radio network node (or a BS) adopting a time section transmission resource structure also applies a downlink transmission method of massive MIMO. In this case, an operation for transmitting, by a network radio node (or a BS), the transmission of a signature, pilot or reference signal for supporting the UE beam tracking of massive MIMO in a specific cycle through a special symbol and receiving, by UE, the signature, pilot or reference signal through a corresponding special symbol may be defined as applied.

2. Uplink (1) Transmission of an Uplink Synchronization Signal

A method for designing the uplink synchronization signal (e.g., a physical random access channel (PRACH) preamble in 3GPP LTE) of UE in the length of one or a plurality of special symbols and transmitting the uplink synchronization signal may be applied in a situation in which this time section transmission resource structure is applied as an uplink transmission frame structure.

(2) Transmission of Uplink Channel Sounding Signal

An uplink channel sounding signal of UE may be designated to be transmitted through a special symbol on the time section transmission resource structure. If a network radio node (or a BS) instructs the uplink channel sounding signal to be transmitted, a UE-specific uplink data transmission grant at a specific point of time prior to a corresponding special symbol by a designated length (it may be designated in a radio frame or subframe unit) may be triggered in a PDCCH using in a channel sounding transmission indicator. In some embodiments, a UE-specific uplink data transmission grant may be designated using an RRC parameter and signaled to UE when a periodical channel sounding signal is transmitted. In both the methods, a point of time at which the transmission of a UE-specific channel sounding signal is attempted and a resource configuration may be previously designated using an RRC parameter and signaled to UE.

(3) Transmission of Physical Uplink Control Channel (PUCCH)

In a situation in which the time section transmission resource structure is applied as an uplink transmission frame structure, a method for transmitting uplink control information of specific UE through a PUCCH designed on one or a plurality of special symbols may be applied. In this case, the uplink control information of UE may be defined as follows.

Uplink scheduling request information according to a change of the transmission buffer state of UE (data arrival)

Downlink channel measurement information of UE

ACK/NACK information for the reception of downlink data by UE

The type of uplink physical control channel transmitted through one or a plurality of special symbols may be designated by taking into consideration the requirement information about of the above-described uplink control information, that is, a bit size. The type basically includes the following two schemes.

Scheme #1: A method for defining one PUCCH supporting an error generation restriction condition that is required for each piece of information on a bit size of uplink control information of a wide range and being applied to control information cases in common.

Scheme #2: A method for defining an individual PUCCH(s) supporting a maximum size of control information bit and an error requirement condition of corresponding information for each piece of control information in the case where a difference between the bit size of individual uplink control information and a required error generation rate restriction condition is defined to be large and transmitting the individual PUCCH(s) through one or a plurality of special symbols.

(4) Utilization of Interference Signal Measurement by UE

An operation for allowing a network radio node (or a BS) to measure the uplink reception interference signal of another network radio node or UE through one or more special symbols may be defined. As a detailed example, a plurality of pieces of specific UE or a specific network radio node (or a BS) may be designated to transmit a special pilot (or reference signal or signature), that is, an object of interference measurement, using a special symbol. In this case, the specific radio network node (or the BS) may check a surrounding interference situation by receiving and detecting such signals. In this case, the transmission of a corresponding pilot through special symbols of pieces of UEs that are to be received by the specific network radio node (or the BS) through uplink may be excluded. Furthermore, for such a purpose, all of subcarrier resources within a specific pilot pattern or a corresponding symbol may be specially defined as a null power pilot.

In the present specification, a short TTI (sTTI) co-exists with a TTI in the existing 3GPP LTE system. In a next generation wireless communication system, a latency needs to be satisfied on a user plane such that a time required when a packet of the BS is delivered to the UE is 1 ms. In the existing 3GPP LTE system, since a latency of 1 ms (existing TTI) is required only to transmit a signal by using a subframe configured of only the existing PDSCH, a more time is required, for example, for decoding a signal, sending an ACK/NACK signal, or retransmitting a resultant signal or the like. Therefore, it is impossible to satisfy the latency of 1 ms on the user plane. Accordingly, to solve this problem, the sTTI which is temporally shorter than the existing TTI is considered.

Herein, the sTTI implies a time length in dictionary meaning. However, in case of applying only TDD, since the sTTI is used at a specific time and the existing TTI is used at other times, the aforementioned problem still remains in that a low latency cannot be satisfied during the existing TTI. Accordingly, FDD is also applied to exhibit a radio resource structure in a frequency division manner such that a short TTI is used in a specific frequency band (subband) and the existing TTI is used on other frequency bands (subbands).

Hereinafter, detailed methods of arranging a radio resource structure are described for the purpose of decreasing a transmission delay of data in a wireless communication system. The description may be briefly divided into a method of designing a flexible short TTI (sTTI) and a method designing a reference signal.

1. Flexible sTTI Design

The existing 3GPP LTE system can adjust a length of a control region in every subframe by using a physical control format indicator channel (PCFICH). In general, one of 1, 2, and 3 OFDM symbols are used for an indication. However, if an sTTI is fixed and arranged in the existing TTI, there is a systematic limitation in that the length of the control region is also fixed due to the sTTI. Such a limitation may cause deterioration in system adaptability and degradation in system performance. Therefore, the present invention describes a flexile sTTI which changes a structure of the sTTI according to the length of the control region. That is, each UE may recognize an arrangement type of the flexible sTTI by decoding the PCFICH. Hereinafter, each embodiment is described on the basis of whether a $1^{st}$ sTTI has a specific symbol.

<When a $1^{st}$ sTTI does not have an Additional Special Symbol>

Having no special symbol in the $1^{st}$ sTTI means sharing of a control region of the existing TTI. That is, if one subframe has M sTTIs, each of sTTIs of $2^{nd}$ to $M^{th}$ sTTIs has at least one special symbol. Although it is assumed that the number of sTTIs is 4 (M=4), the present specification is not limited thereto, and thus the number may be less than or greater than a case of applying the same method.

Since the special symbol of the $1^{st}$ sTTI shares the control region of the existing TTI, it is difficult to perform a function of estimating a synchronization signal and an interference among functions of the special symbol, and only an sPDCCH which is an sTTI dedicated control signal can be transmitted. However, according to the proposed method, since the sPDCCH of the sTTI is managed by integrating with the control region of the existing TTI, there is no need to separately ensure a resource for the sPDCCH, thereby advantageously ensuring a greater amount of sPDSCH resources of the sTTI. Herein, the sPDCCH corresponds to a channel for transmitting control information or the like in each sTTI, and the sPDSCH corresponds to a channel for transmitting downlink data or the like by being scheduled by means of the sPDCCH in each sTTI.

The control information for the sTTI is arranged ahead of the control information for the existing TTI. This is to avoid a decoding time of the sPDSCH from being delayed due to a time of performing decoding of the sPDSCH by advancing a decoding start time of a signal of the sPDSCH of the sTTI. In a situation where the sTTI and the existing TTI co-exist similarly to the present specification, a PCFICH is preferentially arranged temporally to a $1^{st}$ OFDM symbol of a control region. Subsequently, a physical HARQ indicator channel (PHICH) of the sTTI and the existing TTI is arranged, followed by an sPDCCH of the sTTI. Finally, a PDCCH of the existing TTI is arranged. Eventually, it may be seen that the PCFICH, the PHICH, the PDCCH, and the sPDCCH are included in the control region. The PHICH is arranged by considering a resource of an uplink-shared channel (UL-SCH) and a cyclic shift index of a UE-specific reference signal similarly to the existing method. If possible, the PHICH is arranged ahead of an indicator of the sTTI. In this case, a retransmission indicator of the sTTI may be transmitted by being integrated into the sPDCCH.

As an example of arranging the sPDSCH for the sTTI in the existing TTI, the UE knows that it will be arranged at the sTTI in advance through radio resource control (RRC). Accordingly, after decoding the sPDCCH, the UE can read control information by using not a downlink control information (DCI) format for the existing TTI but a DCI format for the sTTI.

Embodiment 1

Figure 7:
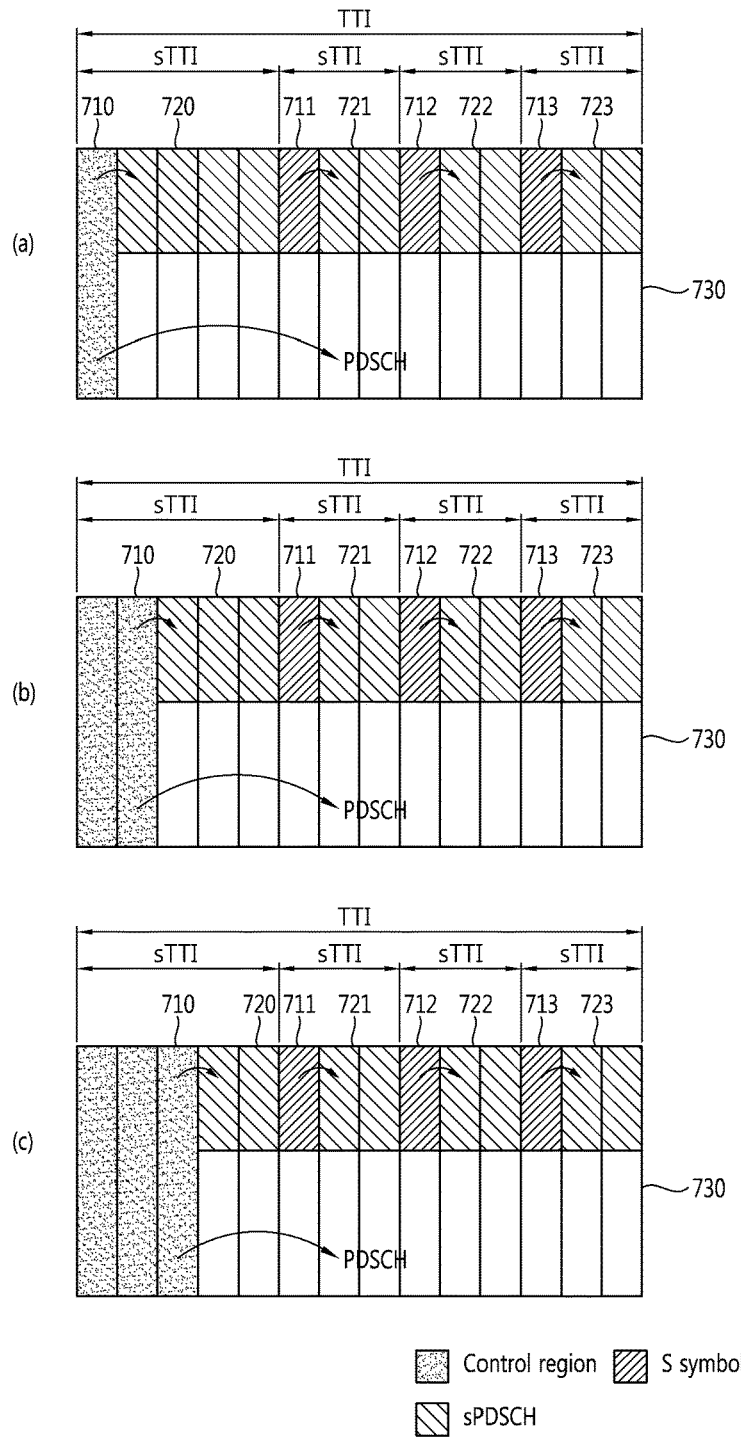
FIG. 7 shows an embodiment of a case where a $1^{st}$ sTTI has a length of 5 OFDM symbols.

FIG. 7 shows an embodiment of a case where a $1^{st}$ sTTI has a length of 5 OFDM symbols.

FIG. 7(a) shows a case where a control region has a length of 1 OFDM symbol in a state where the length of the $1^{st}$ sTTI is fixed to the 5 OFDM symbols. FIG. 7(b) shows a case where a control region has a length of 2 OFDM symbols. FIG. 7(b) shows a case where a control region has a length of 3 OFDM symbols.

An sPDCCH in the $1^{st}$ sTTI is included in a control region 710 of the existing TTI, and sPDCCHs of the $2^{nd}$ sTTI to the $4^{th}$ sTTI are included respectively in special symbols 711, 712, and 713. In each sTTI, the sPDCCH schedules resources 720, 721, 722, and 723 of the sPDSCH. Scheduling is indicated by each arrow in the figure. Herein, the control region 710 of the existing TTI is allocated across the entire bandwidth of a frequency bandwidth. This is because the existing UEs cannot recognize the control region if the control region 710 of the existing TTI is limited to a specific frequency band (subband). However, it can be seen that the sTTI and the TTI are distinguished in terms of not only time but also frequency since a PDSCH 730 in the existing TTI is allocated to a $1^{st}$ frequency band, and the special symbols 711, 712, and 713 and the sPDSCH resources 720, 721, 722, and 723 in the sTTI are allocated to a $2^{nd}$ frequency band.

In FIG. 7(a), if the control region 710 of the existing TTI is 1 OFDM symbol, the $1^{st}$ sTTI has the sPDSCH resource 720 of 4 OFDM symbols. In FIG. 7(b), if the control region 710 of the existing TTI is 2 OFDM symbols, the $1^{st}$ sTTI has the sPDSCH resource 720 of 3 OFDM symbols. In FIG. 7(c), if the control region 710 of the existing TTI is 3 OFDM symbols, the $1^{st}$ sTTI has the sPDSCH resource 720 of 2 OFDM symbols. However, the length of the $2^{nd}$ sTTI to the $4^{th}$ sTTI is fixed to the special symbols 711, 712, and 713 corresponding to 1 OFDM symbol and the sPDSCH resources 721, 722, and 723 corresponding to 2 OFDM symbols.

Embodiment 1 roughly includes the following two steps.

First, the terms are summarized as follows. The sTTI is in the existing TTI and corresponds to a time interval temporally shorter than the existing TTI. A $1^{st}$ downlink channel includes sPDSCHs 720, 721, 722, and 723 received during the sTTI and sPDCCHs 710 (partially), 711, 712, and 713 for scheduling the sPDSCH. A $2^{nd}$ downlink channel corresponds to the existing PDSCH 730 received during the existing TTI. Channel demodulation corresponds to channel decoding.

First, a plurality of $1^{st}$ downlink channels included in a subframe corresponding to one existing TTI and received during the sTTI and the $2^{nd}$ downlink channel 730 received during the existing TTI are received. The number of symbols used for each of the plurality of $1^{st}$ downlink channels is determined on the basis of a format indicator channel included in a $1^{st}$ symbol of the subframe. Herein, the format indicator channel corresponds to a PCFICH. The $1^{st}$ symbol of the subframe is included in the control region 710 of the existing TTI, and the $1^{st}$ symbol corresponds to an arrangement of the PCFICH first in the control region 710 of the existing TTI. Since a size of the control region 710 of the existing TTI can be known by demodulating the PCFICH, the number of symbols used for each of the plurality of $1^{st}$ downlink channels can also be known. For example, in FIG. 7(a), by demodulating the PCFICH, it can be seen that the control region 710 of the existing TTI has a size corresponding to one symbol, and the number of symbols in the sTTI used for each of a plurality of $1^{st}$ downlink channels is sequentially 5, 3, 3, and 3. In FIG. 7(b), by demodulating the PCFICH, it can be seen that the control region 710 of the existing TTI has a size corresponding to two symbols, and the number of symbols in the sTTI used for each of the plurality of $1^{st}$ downlink channels is sequentially 5, 3, 3, and 3. In FIG. 7(c), by demodulating the PCFICH, it can be seen that the control region 710 of the existing TTI has a size corresponding to three symbols, and the number of symbols in the sTTI used for each of the plurality of $1^{st}$ downlink channels is sequentially 5, 3, 3, and 3.

In addition, the plurality of $1^{st}$ downlink channels are sequentially received. That is, they are received in order of a $1^{st}$ sTTI, a $2^{nd}$ sTTI, a $3^{rd}$ sTTI, and a $4^{th}$ sTTI.

A $1^{st}$ symbol of each of the plurality of $1^{st}$ downlink channels corresponds to the special symbols 711, 712, and 713. A $1^{st}$ downlink channel which is first received among the plurality of $1^{st}$ downlink channels is received during the $1^{st}$ sTTI. The $1^{st}$ sTTI is divided into a case of having a special symbol and a case of not having the special symbol. Since the $1^{st}$ sTTI does not have the special symbol in FIG. 7, scheduling information for the $1^{st}$ downlink channel which is first received among the plurality of $1^{st}$ downlink channels is included in the control region 710 of the existing TTI.

The sPDSCHs 720, 721, 722, and 723 and the existing PDSCH 730 are received in different frequency bands. That is, the sTTI represents a radio resource structure by being divided in terms of not only time but also frequency.

Second, the plurality of $1^{st}$ downlink channels are demodulated by using the scheduling information included in each of the plurality of $1^{st}$ downlink channels. The scheduling information included in each of the plurality of $1^{st}$ downlink channels corresponds to control information for scheduling the sPDSCHs 720, 721, 722, and 723 in each sTTI. The control information is included in the sPDCCH 710 (partially), 711, 712, and 713 in each sTTI. In addition, the $2^{nd}$ downlink channel 730 is demodulated by using the scheduling information included in the control region indicated by the format indicator channel. The control region indicated by the format indicator channel corresponds to the control region 710 of the existing TTI, and the scheduling information included in the control region 710 is included in the existing PDCCH (the other parts of 710). That is, this corresponds to demodulation of the existing PDSCH 730 by using the existing PDCCH (the other parts of 710).

Embodiment 2

Figure 8:
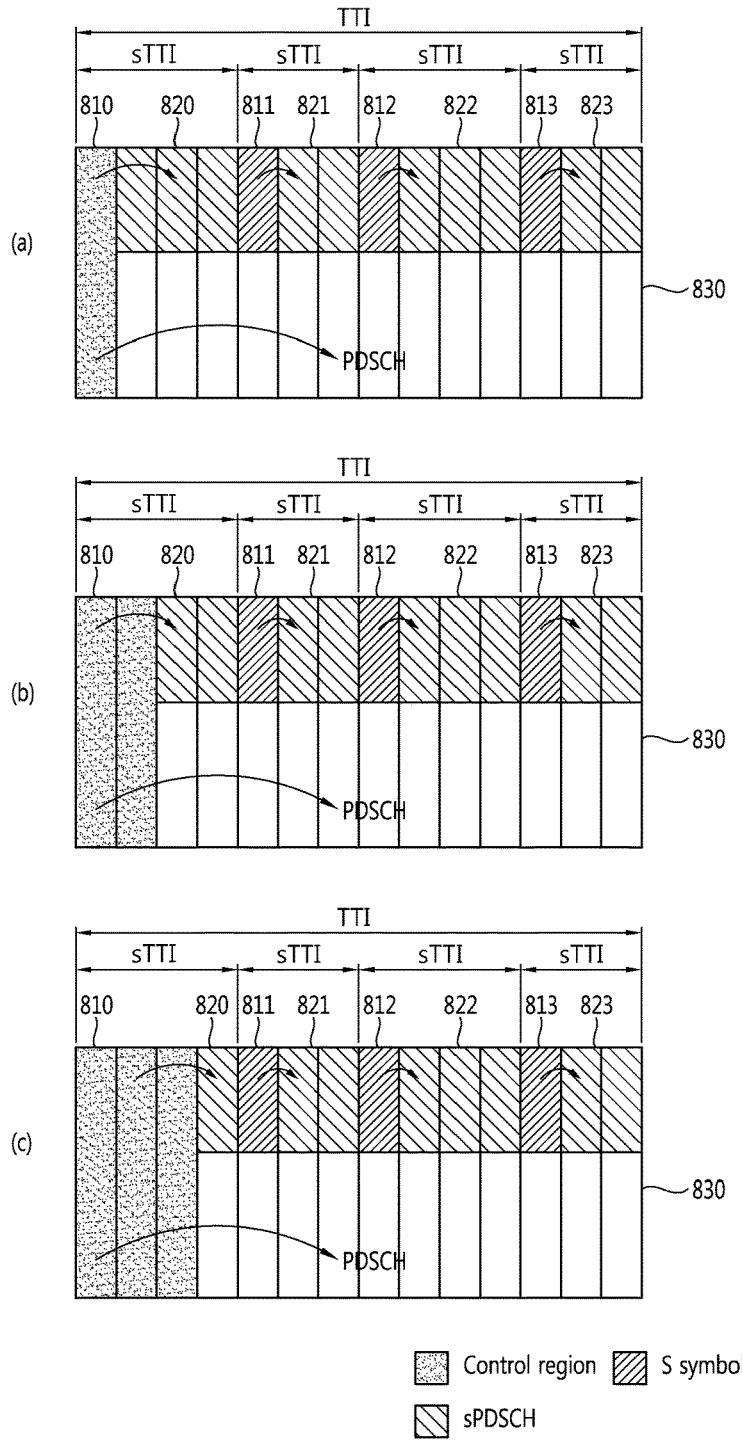
FIG. 8 shows an embodiment of a case where a $1^{st}$ sTTI has a length of 4 OFDM symbols.

FIG. 8 shows an embodiment of a case where a $1^{st}$ sTTI has a length of 4 OFDM symbols.

FIG. 8(a) shows a case where a control region has a length of 1 OFDM symbol in a state where the length of the $1^{st}$ sTTI is fixed to the 4 OFDM symbols. FIG. 8(b) shows a case where a control region has a length of 2 OFDM symbols. FIG. 8(b) shows a case where a control region has a length of 3 OFDM symbols.

In FIG. 8(a), if a control region 810 of the existing TTI is 1 OFDM symbol, the $1^{st}$ sTTI has an sPDSCH resource 820 of 3 OFDM symbols. In FIG. 8(b), if the control region 810 of the existing TTI is 2 OFDM symbols, the $1^{st}$ sTTI has the sPDSCH resource 820 of 2 OFDM symbols. In FIG. 8(c), if the control region 810 of the existing TTI is 3 OFDM symbols, the $1^{st}$ sTTI has the sPDSCH resource 820 of 1 OFDM symbol. However, the length of the $2^{nd}$ sTTI to the $4^{th}$ sTTI is fixed to special symbols 811, 812, and 813 corresponding to 1 OFDM symbol and sPDSCH resources 821, 822, and 823 corresponding to 2 OFDM symbols.

Embodiment 2 roughly includes the following two steps.

First, the terms are summarized as follows. The sTTI is in the existing TTI and corresponds to a time interval temporally shorter than the existing TTI. A $1^{st}$ downlink channel includes the sPDSCHs 820, 821, 822, and 823 received during the sTTI and the sPDCCHs 810 (partially), 811, 812, and 813 for scheduling the sPDSCH. A $2^{nd}$ downlink channel corresponds to an existing PDSCH 830 received during the existing TTI. Channel demodulation corresponds to channel decoding.

First, a plurality of $1^{st}$ downlink channels included in a subframe corresponding to one existing TTI and received during the sTTI and the $2^{nd}$ downlink channel 830 received during the existing TTI are received. The number of symbols used for each of the plurality of $1^{st}$ downlink channels is determined on the basis of a format indicator channel included in a $1^{st}$ symbol of the subframe. Herein, the format indicator channel corresponds to a PCFICH. The $1^{st}$ symbol of the subframe is included in the control region 810 of the existing TTI, and the $1^{st}$ symbol corresponds to an arrangement of the PCFICH first in the control region 810 of the existing TTI. Since a size of the control region 810 of the existing TTI can be known by demodulating the PCFICH, the number of symbols used for each of the plurality of $1^{st}$ downlink channels can also be known. For example, in FIG. 8(a), by demodulating the PCFICH, it can be seen that the control region 810 of the existing TTI has a size corresponding to one symbol, and the number of symbols in the sTTI used for each of a plurality of $1^{st}$ downlink channels is sequentially 4, 3, 4, and 3. In FIG. 8(b), by demodulating the PCFICH, it can be seen that the control region 810 of the existing TTI has a size corresponding to two symbols, and the number of symbols in the sTTI used for each of the plurality of $1^{st}$ downlink channels is sequentially 4, 3, 4, and 3. In FIG. 8(c), by demodulating the PCFICH, it can be seen that the control region 810 of the existing III has a size corresponding to three symbols, and the number of symbols in the sTTI used for each of the plurality of $1^{st}$ downlink channels is sequentially 4, 3, 4, and 3.

In addition, the plurality of $1^{st}$ downlink channels are sequentially received. That is, they are received in order of a $1^{st}$ sTTI, a $2^{nd}$ sTTI, a $3^{rd}$ sTTI, and a $4^{th}$ sTTI.

A $1^{st}$ symbol of each of the plurality of $1^{st}$ downlink channels corresponds to the special symbols 811, 812, and 813. A $1^{st}$ downlink channel which is first received among the plurality of $1^{st}$ downlink channels is received during the $1^{st}$ sTTI. The $1^{st}$ sTTI is divided into a case of having a special symbol and a case of not having the special symbol. Since the $1^{st}$ sTTI does not have the special symbol in FIG. 8, scheduling information for the $1^{st}$ downlink channel which is first received among the plurality of $1^{st}$ downlink channels is included in the control region 810 of the existing TTI.

The sPDSCHs 820, 821, 822, and 823 and the existing PDSCH 830 are received in different frequency bands. That is, the sTTI represents a radio resource structure by being divided in terms of not only time but also frequency.

Second, the plurality of $1^{st}$ downlink channels are demodulated by using the scheduling information included in each of the plurality of $1^{st}$ downlink channels. The scheduling information included in each of the plurality of $1^{st}$ downlink channels corresponds to control information for scheduling the sPDSCHs 820, 821, 822, and 823 in each sTTI. The control information is included in the sPDCCH 810 (partially), 811, 812, and 813 in each sTTI. In addition, the $2^{nd}$ downlink channel 830 is demodulated by using the scheduling information included in the control region indicated by the format indicator channel. The control region indicated by the format indicator channel corresponds to the control region 810 of the existing TTI, and the scheduling information included in the control region 810 is included in the existing PDCCH (other parts of 810). That is, this corresponds to demodulation of the existing PDSCH 830 by using the existing PDCCH (other parts of 810).

Embodiment 3

Figure 9:
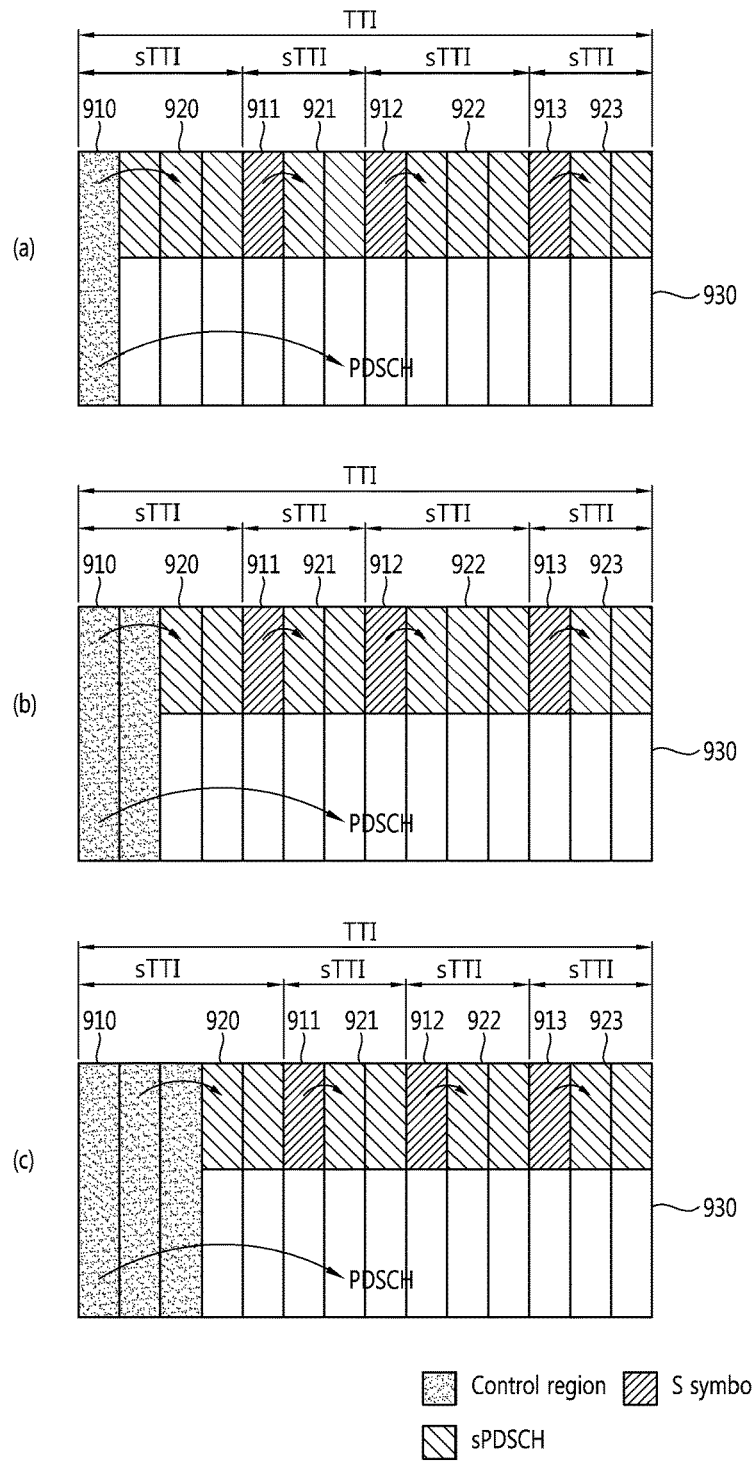
FIG. 9 shows an embodiment of a case where a length of a $1^{st}$ sTTI is changed.

FIG. 9 shows an embodiment of a case where a length of a $1^{st}$ sTTI is changed.

Unlike in FIG. 7 and FIG. 8, FIG. 9(*a*) shows a case where a control region has a length of 1 OFDM symbol in a state where the length of the $1^{st}$ sTTI can be changed. FIG. 9(*b*) shows a case where a control region has a length of 2 OFDM symbols. FIG. 9(*c*) shows a case where a control region has a length of 3 OFDM symbols.

In FIG. 9(*a*), if a control region 910 of the existing TTI is 1 OFDM symbol, $1^{st}$ and $3^{rd}$ sTTIs have a length of 4 OFDM symbols, and $2^{nd}$ and $4^{th}$ sTTIs have a length of 3 OFDM symbols. The $1^{st}$ sTTI shares the control region 910 of the existing TTI and has an sPDSCH resource 920 having a length of 3 OFDM symbols. The $3^{rd}$ TTI has one special symbol 912 and an sPDSCH resource 922 having a length of 3 OFDM symbols. The $2^{nd}$ and $4^{th}$ sTTIs have single special symbols 911 and 913 and sPDSCH resources 921 and 923 having a length of 2 OFDM symbols. In FIG. 9(*a*), the length of the $1^{st}$ and $3^{rd}$ sPDSCH resources is temporally longer than the length of the $2^{nd}$ and $4^{th}$ sPDSCH resources. The reason of this is to decrease a buffering time caused by scheduling since more data channels are arranged with a uniform distance.

In FIG. 9(*b*), if the control region 910 of the existing TTI is 2 OFDM symbols, $1^{st}$ and $3^{rd}$ sTTIs have a length of 4 OFDM symbols, and $2^{nd}$ and $4^{th}$ sTTIs have a length of 3 OFDM symbols. The $1^{st}$ sTTI shares the control region 910 of the existing TTI and has the sPDSCH resource 920 having a length of 2 OFDM symbols. The $2^{nd}$ to $4^{th}$ sTTIs have the same structure as shown in FIG. 9(*a*). With this arrangement, a change in the length of the sTTI on the basis of the control region 910 of the existing TTI can be minimized. Accordingly, a processing time in an upper layer can be predictable.

In FIG. 9(*c*), if the control region 910 of the existing TTI is 3 OFDM symbols, a $1^{st}$ sTTI has a length of 5 OFDM, symbols, and $2^{nd}$ to $4^{th}$ sTTIs have a length of 3 OFDM symbols. The $1^{st}$ sTTI shares the control region 910 of the existing TTI and has the sPDSCH resource 920 having a length of 2 OFDM symbols. The $2^{nd}$ to $4^{th}$ sTTIs have single special symbols 911, 912, and 913 and sPDSCH resources 921, 922, 923 having a length of 2 OFDM symbols.

Embodiment 3 roughly includes the following two steps.

First, the terms are summarized as follows. The sTTI is in the existing TTI and corresponds to a time interval temporally shorter than the existing TTI. A $1^{st}$ downlink channel includes the sPDSCHs 920, 921, 922, and 923 received during the sTTI and sPDCCHs 910 (partially), 911, 912, and 913 for scheduling the sPDSCH. A $2^{nd}$ downlink channel corresponds to the existing PDSCH 930 received during the existing TTI. Channel demodulation corresponds to channel decoding.

First, a plurality of $1^{st}$ downlink channels included in a subframe corresponding to one existing TTI and received during the sTTI and the $2^{nd}$ downlink channel 930 received during the existing TTI are received. The number of symbols used for each of the plurality of $1^{st}$ downlink channels is determined on the basis of a format indicator channel included in a $1^{st}$ symbol of the subframe. Herein, the format indicator channel corresponds to a PCFICH. The $1^{st}$ symbol of the subframe is included in the control region 910 of the existing TTI, and the $1^{st}$ symbol corresponds to an arrangement of the PCFICH first in the control region 910 of the existing TTI. Since a size of the control region 910 of the existing TTI can be known by demodulating the PCFICH, the number of symbols used for each of the plurality of $1^{st}$ downlink channels can also be known. For example, in FIG. 9(*a*), by demodulating the PCFICH, it can be seen that the control region 910 of the existing TTI has a size corresponding to one symbol, and the number of symbols in the sTTI used for each of a plurality of $1^{st}$ downlink channels is sequentially 4, 3, 4, and 3. In FIG. 9(*b*), by demodulating the PCFICH, it can be seen that the control region 910 of the existing TTI has a size corresponding to two symbols, and the number of symbols in the sTTI used for each of the plurality of $1^{st}$ downlink channels is sequentially 4, 3, 4, and 3. In FIG. 9(*c*), by demodulating the PCFICH, it can be seen that the control region 910 of the existing TTI has a size corresponding to three symbols, and the number of symbols in the sTTI used for each of the plurality of $1^{st}$ downlink channels is sequentially 5, 3, 3, and 3.

In addition, the plurality of $1^{st}$ downlink channels are sequentially received. That is, they are received in order of a $1^{st}$ sTTI, a $2^{nd}$ sTTI, a $3^{rd}$ sTTI, and a $4^{th}$ sTTI.

A $1^{st}$ symbol of each of the plurality of $1^{st}$ downlink channels corresponds to the special symbols 911, 912, and 913. A $1^{st}$ downlink channel which is first received among the plurality of $1^{st}$ downlink channels is received during the $1^{st}$ sTTI. The $1^{st}$ sTTI is divided into a case of having a special symbol and a case of not having the special symbol. Since the $1^{st}$ sTTI does not have the special symbol in FIG. 9, scheduling information for the $1^{st}$ downlink channel which is first received among the plurality of $1^{st}$ downlink channels is included in the control region 910 of the existing TTI.

The sPDSCHs 920, 921, 922, and 923 and the existing PDSCH 930 are received in different frequency bands. That is, the sTTI represents a radio resource structure by being divided in terms of not only time but also frequency.

Second, the plurality of $1^{st}$ downlink channels are demodulated by using the scheduling information included in each of the plurality of $1^{st}$ downlink channels. The scheduling information included in each of the plurality of $1^{st}$ downlink channels corresponds to control information for scheduling the sPDSCHs 920, 921, 922, and 923 in each sTTI. The control information is included in the sPDCCH 910 (partially), 911, 912, and 913 in each sTTI. In addition, the $2^{nd}$ downlink channel 930 is demodulated by using the scheduling information included in the control region indicated by the format indicator channel. The control region indicated by the format indicator channel corresponds to the control region 910 of the existing TTI, and the scheduling information included in the control region 910 is included in the existing PDCCH (other parts of 910). That is, this corresponds to demodulation of the existing PDSCH 930 by using the existing PDCCH (other parts of 910).

Embodiment 4

Figure 10:
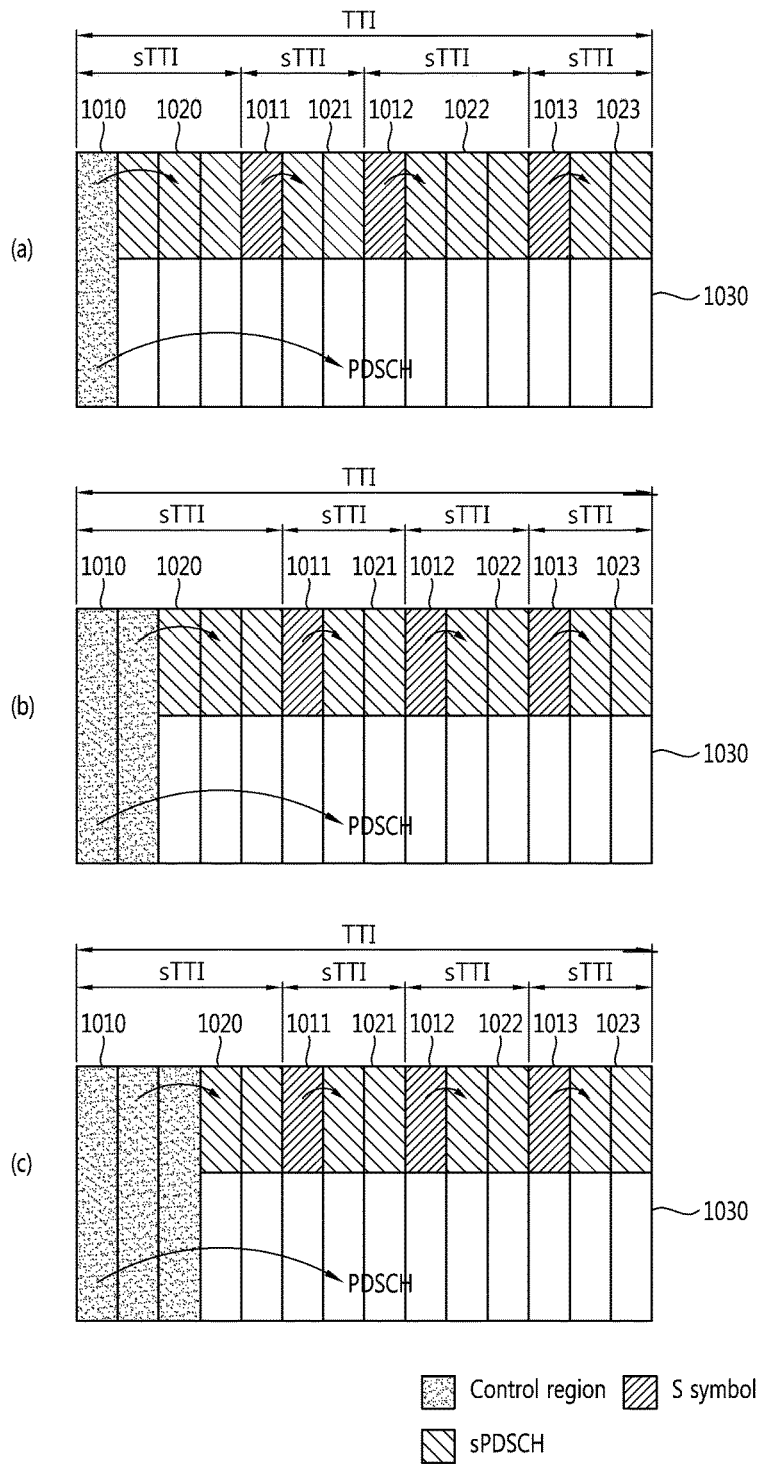
FIG. 10 shows another embodiment of a case where a length of a $1^{st}$ sTTI is changed.

FIG. 10 shows another embodiment of a case where a length of a $1^{st}$ sTTI is changed.

FIG. 10(a) shows a case where a control region has a length of 1 OFDM symbol as another embodiment of a case where the length of the $1^{st}$ sTTI is changed. FIG. 10(b) shows a case where a control region has a length of 2 OFDM symbols. FIG. 10(c) shows a case where a control region has a length of 3 OFDM symbols.

Although the same structure disclosed in FIG. 9(a) and FIG. 9(c) is used when a control region 1010 of the existing TTI has a length of 1 OFDM symbol and 3 OFDM symbols, a different arrangement is achieved in case of 2 OFDM symbols.

When the control region 1010 of the existing TTI has a length of 2 OFDM symbols in FIG. 10(b), an sPDSCH resource having a length of 3 OFDM symbols may be used by selecting any one of four sTTIs. In FIG. 10(b), an sPDSCH is allocated to the 3 OFDM symbols by randomly selecting a $1^{st}$ sTTI.

Embodiment 4 roughly includes the following two steps.

First, the terms are summarized as follows. The sTTI is in the existing TTI and corresponds to a time interval temporally shorter than the existing TTI. A $1^{st}$ downlink channel includes sPDSCHs 1020, 1021, 1022, and 1023 received during the sTTI and sPDCCHs 1010 (partially), 1011, 1012, and 1013 for scheduling the sPDSCH. A $2^{nd}$ downlink channel corresponds to the existing PDSCH 1030 received during the existing TTI. Channel demodulation corresponds to channel decoding.

First, a plurality of $1^{st}$ downlink channels included in a subframe corresponding to one existing TTI and received during the sTTI and a $2^{nd}$ downlink channel 1030 received during the existing TTI are received. The number of symbols used for each of the plurality of $1^{st}$ downlink channels is determined on the basis of a format indicator channel included in a $1^{st}$ symbol of the subframe. Herein, the format indicator channel corresponds to a PCFICH. The $1^{st}$ symbol of the subframe is included in a control region 1010 of the existing TTI, and the $1^{st}$ symbol corresponds to an arrangement of the PCFICH first in the control region 1010 of the existing TTI. Since a size of the control region 1010 of the existing TTI can be known by demodulating the PCFICH, the number of symbols used for each of the plurality of $1^{st}$ downlink channels can also be known. For example, in FIG. 10(a), by demodulating the PCFICH, it can be seen that the control region 1010 of the existing TTI has a size corresponding to one symbol, and the number of symbols in the sTTI used for each of a plurality of $1^{st}$ downlink channels is sequentially 4, 3, 4, and 3. In FIG. 10(b), by demodulating the PCFICH, it can be seen that the control region 1010 of the existing TTI has a size corresponding to two symbols, and the number of symbols in the sTTI used for each of the plurality of $1^{st}$ downlink channels is sequentially 5, 3, 3, and 3. In FIG. 10(c), by demodulating the PCFICH, it can be seen that the control region 1010 of the existing TTI has a size corresponding to three symbols, and the number of symbols in the sTTI used for each of the plurality of $1^{st}$ downlink channels is sequentially 5, 3, 3, and 3.

In addition, the plurality of $1^{st}$ downlink channels are sequentially received. That is, they are received in order of a $1^{st}$ sTTI, a $2^{nd}$ sTTI, a $3^{rd}$ sTTI, and a $4^{th}$ sTTI.

A $1^{st}$ symbol of each of the plurality of $1^{st}$ downlink channels corresponds to the special symbols 1011, 1012, and 1013. A $1^{st}$ downlink channel which is first received among the plurality of $1^{st}$ downlink channels is received during the $1^{st}$ sTTI. The $1^{st}$ sTTI is divided into a case of having a special symbol and a case of not having the special symbol. Since the $1^{st}$ sTTI does not have the special symbol in FIG. 10, scheduling information for the $1^{st}$ downlink channel which is first received among the plurality of $1^{st}$ downlink channels is included in the control region 1010 of the existing TTI.

The sPDSCHs 1020, 1021, 1022, and 1023 and the existing PDSCH 1030 are received in different frequency bands. That is, the sTTI represents a radio resource structure by being divided in terms of not only time but also frequency.

Second, the plurality of $1^{st}$ downlink channels are demodulated by using the scheduling information included in each of the plurality of $1^{st}$ downlink channels. The scheduling information included in each of the plurality of $1^{st}$ downlink channels corresponds to control information for scheduling the sPDSCHs 1020, 1021, 1022, and 1023 in each sTTI. The control information is included in the sPDCCH 1010 (partially), 1011, 1012, and 1013 in each sTTI. In addition, the $2^{nd}$ downlink channel 1030 is demodulated by using the scheduling information included in the control region indicated by the format indicator channel. The control region indicated by the format indicator channel corresponds to the control region 1010 of the existing TTI, and the scheduling information included in the control region 1010 is included in the existing PDCCH (other parts of 1010). That is, this corresponds to demodulation of the existing PDSCH 1030 by using the existing PDCCH (other parts of 1010).

<When a $1^{st}$ sTTI does not have an Additional Special Symbol>

Unlike in the description of FIG. 7 to FIG. 10, it is shown a case where a $1^{st}$ sTTI also has a special symbol and thus each sTTI has at least one special symbol. Accordingly, a control region of the existing TTI may correspond to a waiting duration since it does not have an effect on an operation of the sTTI.

There is an advantage in that the $1^{st}$ sTTI can also perform interference measurement, synchronization signal transmission, or the like by using the special symbol since the $1^{st}$ sTTI has the special symbol, whereas there is a disadvantage in that an sPDSCH resource that can be used by the sTTI is decreased. However, a decoding time in the $1^{st}$ sTTI may not be quickly processed since the control region of the existing TTI performs blind decoding even though resources may be more saved when the $1^{st}$ sTTI does not have the special symbols. In this case, if the control information is compactly decoded by using the special symbol of the $1^{st}$ sTTI, there may be an advantage in that the decoding time is decreased unlike in the embodiment 1 to the embodiment 4.

Embodiment 5

Figure 11:
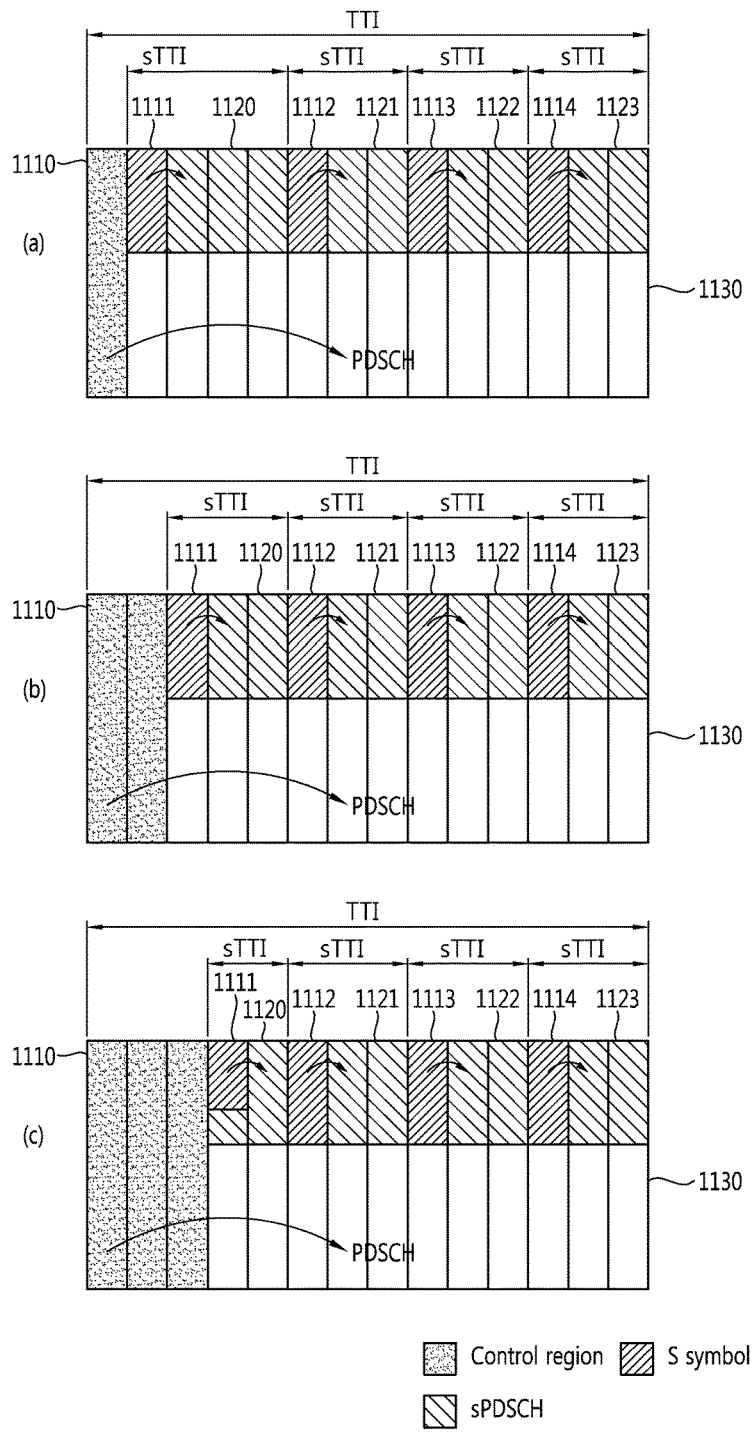
FIG. 11 shows an embodiment when a $1^{st}$ sTTI has a special symbol.

FIG. 11 shows an embodiment when a $1^{st}$ sTTI has a special symbol.

FIG. 11(a) shows a case where a control region has a length of 1 OFDM symbol. FIG. 11(b) shows a case where a control region has a length of 2 OFDM symbols. FIG. 11(c) shows a case where a control region has a length of 3 OFDM symbols.

In FIG. 11, lengths of the $2^{nd}$ to $4^{th}$ sTTIs are constantly maintained by changing the length of the $1^{st}$ sTTI according to a length of a control region 1110 of the existing TTI. The $2^{nd}$ to $4^{th}$ sTTIs have single special symbols 1112, 1113, and 1114 and sPDSCH resources 1121, 1122, and 1123 corresponding to 2 OFDM symbols. Although a case where only the length of the 1$^{st}$ sTTI is changed is assumed in FIG. 11, the present invention is not limited thereto, and thus the length of the 2$^{nd}$, 3$^{rd}$, or 4$^{th}$ sTTI may also be changed.

If the control region 1110 has a length of 1 OFDM symbol in FIG. 11(a), the 1$^{st}$ sTTI has one special symbol 1111 and an sPDSCH resource 1120 corresponding to 3 OFDM symbols. If the control region 1110 has a length of 2 OFDM symbols in FIG. 11(b), the 1$^{st}$ sTTI has one special symbol 1111 and the sPDSCH resource 1120 corresponding to 2 OFDM symbols. If the control region 1110 has a length of 3 OFDM symbols in FIG. 11(c), the 1$^{st}$ sTTI has one special symbol 1111 and the sPDSCH resource 1120 corresponding to 1 OFDM symbol. In this case, since the sPDSCH resource 1120 may be insufficient in comparison with the special symbol 1111, the special symbol 1111 may be transmitted only in a specific subcarrier, and the sPDSCH is transmitted in the remaining subcarrier parts. Information regarding the specific frequency band or the specific subcarrier may be known to the UE in advance through RRC.

Embodiment 5 roughly includes the following two steps.

First, the terms are summarized as follows. The sTTI is in the existing TTI and corresponds to a time interval temporally shorter than the existing TTI. A 1$^{st}$ downlink channel includes the sPDSCHs 1120, 1121, 1122, and 1123 received during the sTTI and sPDCCHs 1111, 1112, 1113, 1114 for scheduling the sPDSCH. A 2$^{nd}$ downlink channel corresponds to the existing PDSCH 1130 received during the existing TTI. Channel demodulation corresponds to channel decoding.

First, a plurality of 1$^{st}$ downlink channels included in a subframe corresponding to one existing TTI and received during the sTTI and a 2$^{nd}$ downlink channel 1130 received during the existing TTI are received. The number of symbols used for each of the plurality of 1$^{st}$ downlink channels is determined on the basis of a format indicator channel included in a 1$^{st}$ symbol of the subframe. Herein, the format indicator channel corresponds to a PCFICH. The 1$^{st}$ symbol of the subframe is included in a control region 1110 of the existing TTI, and the 1$^{st}$ symbol corresponds to an arrangement of the PCFICH first in the control region 1110 of the existing TTI. Since a size of the control region 1110 of the existing TTI can be known by demodulating the PCFICH, the number of symbols used for each of the plurality of 1$^{st}$ downlink channels can also be known. For example, in FIG. 11(a), by demodulating the PCFICH, it can be seen that the control region 1110 of the existing TTI has a size corresponding to one symbol, and the number of symbols in the sTTI used for each of a plurality of 1$^{st}$ downlink channels is sequentially 4, 3, 3, and 3. In FIG. 11(b), by demodulating the PCFICH, it can be seen that the control region 1110 of the existing TTI has a size corresponding to two symbols, and the number of symbols in the sTTI used for each of the plurality of 1$^{st}$ downlink channels is sequentially 3, 3, 3, and 3. In FIG. 11(c), by demodulating the PCFICH, it can be seen that the control region 1110 of the existing TTI has a size corresponding to three symbols, and the number of symbols in the sTTI used for each of the plurality of 1$^{st}$ downlink channels is sequentially 2, 3, 3, and 3.

In addition, the plurality of 1$^{st}$ downlink channels are sequentially received. That is, they are received in order of a 1$^{st}$ sTTI, a 2$^{nd}$ sTTI, a 3$^{rd}$ sTTI, and a 4$^{th}$ sTTI.

A 1$^{st}$ symbol of each of the plurality of 1$^{st}$ downlink channels corresponds to the special symbols 1111, 1112, 1113, and 1114. A 1$^{st}$ downlink channel which is first received among the plurality of 1$^{st}$ downlink channels is received during the 1$^{st}$ sTTI. The 1$^{st}$ sTTI is divided into a case of having a special symbol and a case of not having the special symbol. Since the 1$^{st}$ sTTI has the special symbol 1111 in FIG. 11, scheduling information for the 1$^{st}$ downlink channel which is first received among the plurality of 1$^{st}$ downlink channels is included in the 1$^{st}$ symbols 1111, 1112, 1113, and 1114 of the plurality of 1$^{st}$ downlink channels.

The sPDSCHs 1120, 1121, 1122, and 1123 and the existing PDSCH 1130 are received in different frequency bands. That is, the sTTI represents a radio resource structure by being divided in terms of not only time but also frequency.

Second, the plurality of 1$^{st}$ downlink channels are demodulated by using the scheduling information included in each of the plurality of 1$^{st}$ downlink channels. The scheduling information included in each of the plurality of 1$^{st}$ downlink channels corresponds to control information for scheduling the sPDSCHs 1120, 1121, 1122, and 1123 in each sTTI. The control information is included in the sPDCCH 1111, 1112, 1113, and 1114 in each sTTI. In addition, the 2$^{nd}$ downlink channel 1130 is demodulated by using the scheduling information included in the control region indicated by the format indicator channel. The control region indicated by the format indicator channel corresponds to the control region 1111 of the existing TTI, and the scheduling information included in the control region 1111 is included in the existing PDCCH (other parts of 1111). That is, this corresponds to demodulation of the existing PDSCH 1130 by using the existing PDCCH (other parts of 1111).

Embodiment 6

Figure 12:
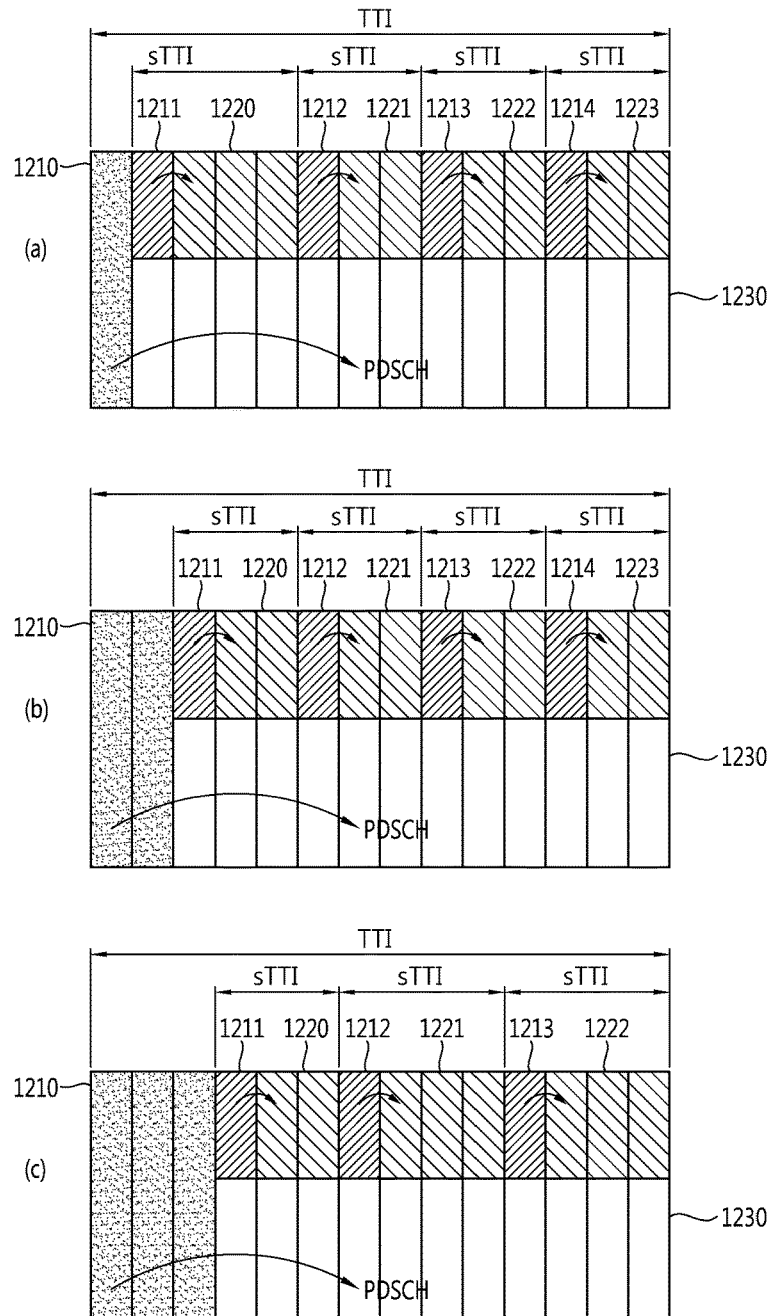
FIG. 12 shows an embodiment when a $1^{st}$ sTTI has a special symbol and the number of sTTIs in the existing TTI is changed.

FIG. 12 shows an embodiment when a 1$^{st}$ sTTI has a special symbol and the number of sTTIs in the existing TTI is changed.

In FIG. 12, a method of adjusting the number of sTTIs in the TTI is illustrated according to a length of a control region. FIG. 12(a) shows a case where a control region has a length of 1 OFDM symbol. FIG. 12(b) shows a case where a control region has a length of 2 OFDM symbols. FIG. 12(c) shows a case where a control region has a length of 3 OFDM symbols.

If a control region 1210 has a length of 3 OFDM symbols in FIG. 12(c), data transmission may be inefficient since one sTTI in the TTI has an sPDSCH having a length shorter than 2 OFDM symbols, and thus the method is proposed to avoid this. For example, if the control region 1210 has a length of 1 or 2 OFDM symbols, it is similar to the case of FIG. 11(a) and FIG. 11(b), whereas if the control region 1210 has a length of 3 OFDM symbols, the number of sTTIs in the TTI is decreased to 3. In FIG. 12(c), the length of the 1$^{st}$ sTTI is set to 3 OFDM symbols, and the lengths of the 2$^{nd}$ and 3$^{rd}$ sTTIs are set to 4 OFDM symbols. This is because a time of receiving data by the UE can be reduced by arranging a relatively short sTTI since the 1$^{st}$ sTTI has a waiting time generated by 3 OFDM symbols due to the control region 1210 which is temporally precedent.

Embodiment 6 roughly includes the following two steps.

First, the terms are summarized as follows. The sTTI is in the existing TTI and corresponds to a time interval temporally shorter than the existing TTI. A 1$^{st}$ downlink channel includes sPDSCHs 1220, 1221, 1222, and 1223 received during the sTTI and sPDCCHs 1211, 1212, 1213, and 1214 for scheduling the sPDSCH. A 2$^{nd}$ downlink channel corresponds to the existing PDSCH 1230 received during the existing TTI. Channel demodulation corresponds to channel decoding.

First, a plurality of 1$^{st}$ downlink channels included in a subframe corresponding to one existing ITT and received during the sTTI and a 2$^{nd}$ downlink channel 1230 received during the existing TTI are received. The number of symbols used for each of the plurality of $1^{st}$ downlink channels is determined on the basis of a format indicator channel included in a $1^{st}$ symbol of the subframe. Herein, the format indicator channel corresponds to a PCFICH. The $1^{st}$ symbol of the subframe is included in a control region 1210 of the existing TTI, and the $1^{st}$ symbol corresponds to an arrangement of the PCFICH first in the control region 1210 of the existing TTI. Since a size of the control region 1210 of the existing TTI can be known by demodulating the PCFICH, the number of symbols used for each of the plurality of $1^{st}$ downlink channels can also be known. For example, in FIG. 12(a), by demodulating the PCFICH, it can be seen that the control region 1210 of the existing TTI has a size corresponding to one symbol, and the number of symbols in the sTTI used for each of a plurality of $1^{st}$ downlink channels is sequentially 4, 3, 3, and 3. In FIG. 12(b), by demodulating the PCFICH, it can be seen that the control region 1210 of the existing TTI has a size corresponding to two symbols, and the number of symbols in the sTTI used for each of the plurality of $1^{st}$ downlink channels is sequentially 3, 3, 3, and 3. In FIG. 12(c), by demodulating the PCFICH, it can be seen that the control region 1210 of the existing TTI has a size corresponding to three symbols, and the number of symbols in the sTTI used for each of the plurality of $1^{st}$ downlink channels is sequentially 3, 4, and 4.

In addition, the plurality of $1^{st}$ downlink channels are sequentially received. That is, they are received in order of a $1^{st}$ sTTI, a $2^{nd}$ sTTI, a $3^{rd}$ sTTI, and a $4^{th}$ sTTI.

A $1^{st}$ symbol of each of the plurality of $1^{st}$ downlink channels corresponds to the special symbols 1211, 1212, 1213, and 1214. A $1^{st}$ downlink channel which is first received among the plurality of $1^{st}$ downlink channels is received during the $1^{st}$ sTTI. The $1^{st}$ sTTI is divided into a case of having a special symbol and a case of not having the special symbol. Since the $1^{st}$ sTTI has the special symbol 1211 in FIG. 12, scheduling information for the $1^{st}$ downlink channel which is first received among the plurality of $1^{st}$ downlink channels is included in the $1^{st}$ symbols 1211, 1212, 1213, and 1214 of the plurality of $1^{st}$ downlink channels.

The sPDSCHs 1220, 1221, 1222, and 1223 and the existing PDSCH 1230 are received in different frequency bands. That is, the sTTI represents a radio resource structure by being divided in terms of not only time but also frequency.

Second, the plurality of $1^{st}$ downlink channels are demodulated by using the scheduling information included in each of the plurality of $1^{st}$ downlink channels. The scheduling information included in each of the plurality of $1^{st}$ downlink channels corresponds to control information for scheduling the sPDSCHs 1220, 1221, 1222, and 1223 in each sTTI. The control information is included in the sPDCCH 1211, 1212, 1213, and 1214 in each sTTI. In addition, the $2^{nd}$ downlink channel 1230 is demodulated by using the scheduling information included in the control region indicated by the format indicator channel. The control region indicated by the format indicator channel corresponds to the control region 1211 of the existing TTI, and the scheduling information included in the control region 1211 is included in the existing PDCCH (other parts of 1211). That is, this corresponds to demodulation of the existing PDSCH 1230 by using the existing PDCCH (other parts of 1211).

Reference Signal Design

Figure 13:
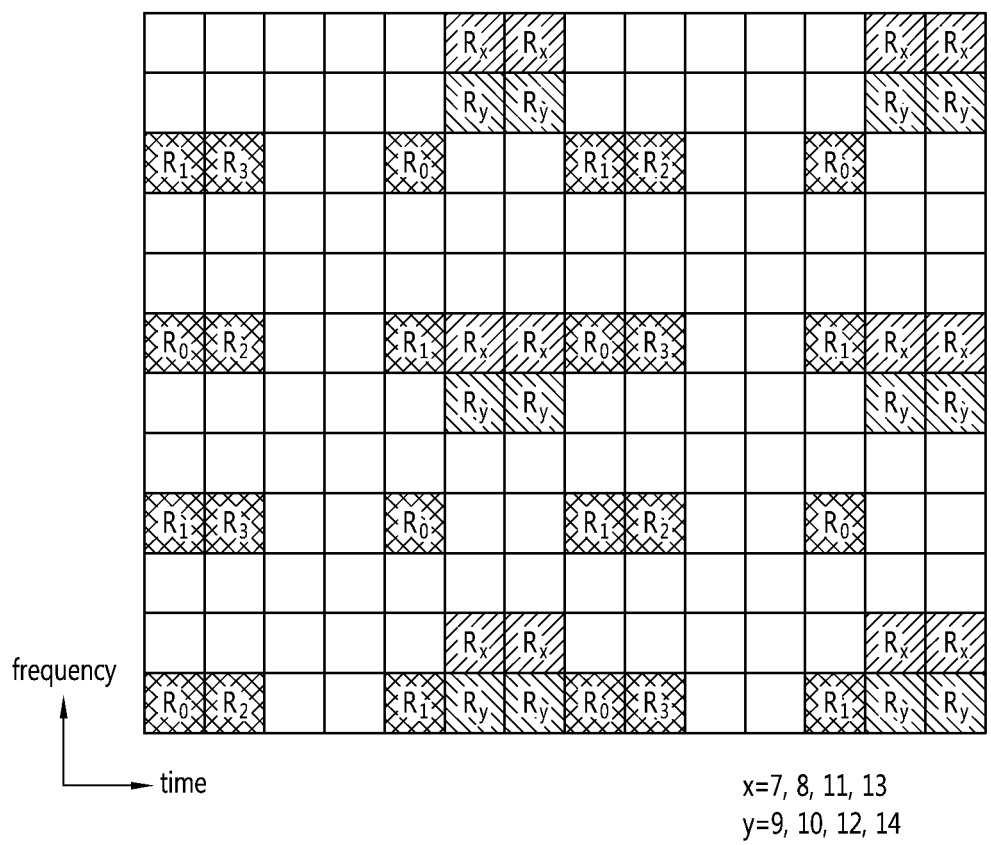
FIG. 13 shows an arrangement of a cell-specific reference signal and a UE-specific reference signal in the existing LTE system.

FIG. 13 shows an arrangement of a cell-specific reference signal and a UE-specific reference signal in the existing LTE system.

The existing downlink reference signal may be a cell-specific reference signal (CRS), a UE-specific reference signal (UE-RS), a channel state information reference signal (CSI-RS), or the like. Since the reference signal is arranged according to the existing TTI structure, it is also necessary to arrange the reference signal optimized for an sTTI. This is because the shorter the TTI, the greater the overhead of the reference signal. The present specification proposes a method of optimizing a UE-specific reference signal according to the sTTI while maintaining a CRS by considering compatibility with the existing LTE system. However, it is aimed that an original position is not deviated as much as possible even if a position of the UE-specific reference signal is changed.

As shown in FIG. 13, in the existing LTE system, a UE-specific reference signal is arranged in $6^{th}$, $7^{th}$, $11^{th}$, and $14^{th}$ symbols on a time axis of a subframe. Antenna ports 7, 8, 11, and 13 correspond to Rx, and antenna ports 9, 10, 12, and 14 correspond to Ry. Therefore, if the sTTI is constructed for symbols in which the UE-specific reference signal is not arranged, a multi-antenna transmission scheme (e.g., beamforming, MIMO) using the UE-specific reference signal cannot be used in a corresponding sTTI region. In addition, since the existing TTI is divided into several sTTIs, the existing UE-specific reference signal designed for 14 OFDM symbols cannot be used. For example, in the existing TTI, the antenna ports 7, 8, 11, and 13 divide the UE-specific reference signal in the same radio resource into four antenna layers by multiplying a walsh code having a length of 4 in a time-axis direction. However, when the sTTI is introduced, since the UE-specific reference signal in the same subcarrier is reduced from four to two (a portion to which Rx is assigned is reduced since a time interval is shortened), the walsh code having the length of 4 cannot be used. In addition, an excessive increase in the UE-specific reference signal in the interval shortened to the sTTI may cause performance degradation due to an overhead increase.

Accordingly, a method of optimizing a UE-specific reference signal to an sTTI is described to solve the aforementioned problems.

Figure 14:
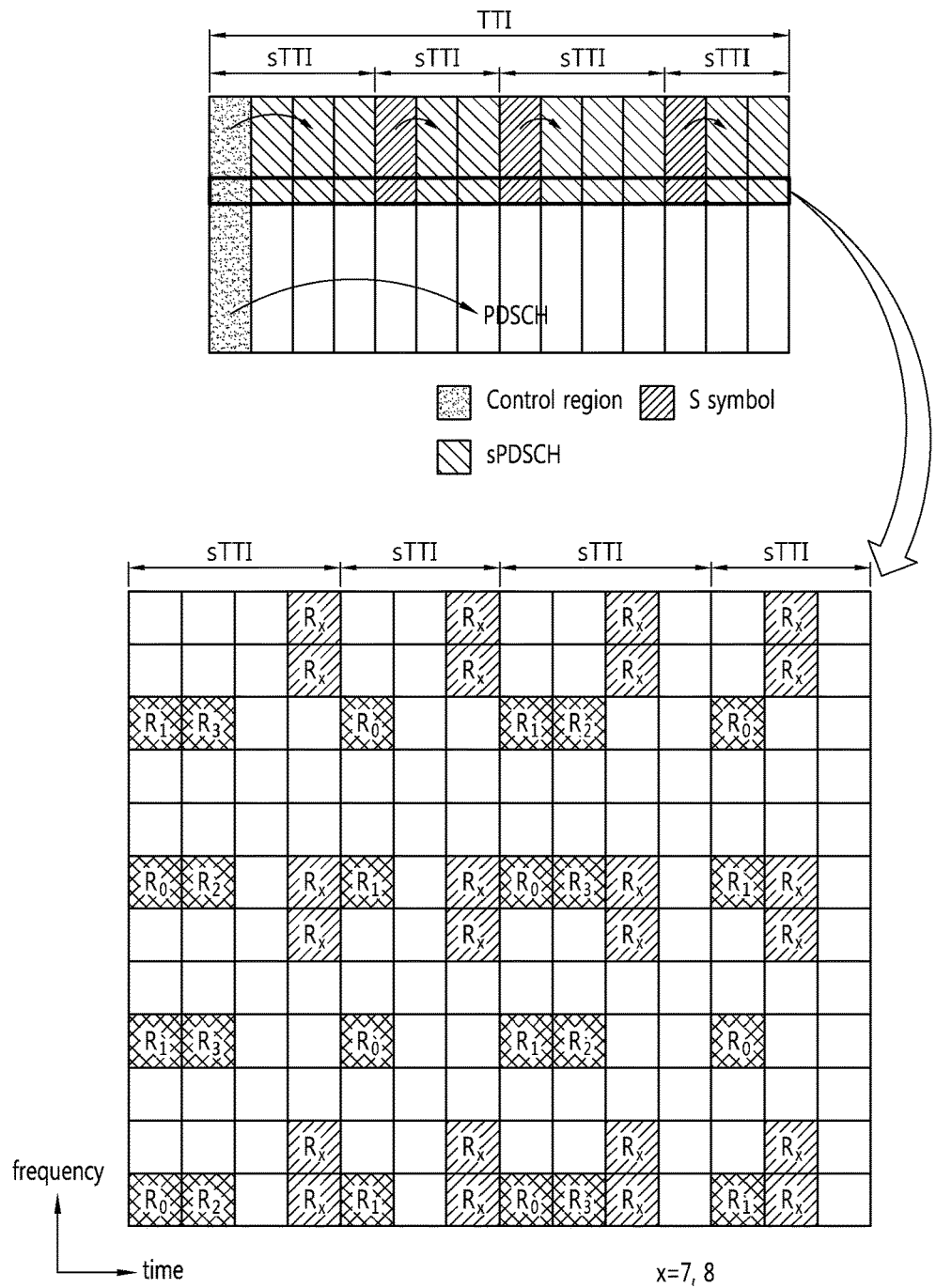
FIG. 14 shows an embodiment of an arrangement of a UE-specific reference signal for an sTTI.

FIG. 14 shows an embodiment of an arrangement of a UE-specific reference signal for an sTTI.

FIG. 14 is illustrated on the basis of a specific resource block extended in a specific frequency band including a plurality of resource blocks for the sTTI in a subframe illustrated in FIG. 7 to FIG. 12. Therefore, since it is based on one subframe, it can be seen that the specific resource block consists of 14 OFDM symbols in a time domain and 12 subcarriers in a frequency domain. Herein, although it is based on the sTTI arrangement of FIG. 8, the present invention is not limited thereto, and thus another sTTI arrangement is also possible.

FIG. 14 is characterized in that at least one UE-specific reference signal is arranged for each sTTI. In this case, an antenna port used for the sTTI may be limited to {7, 8} or {9, 10} or {7, 8, 9, 10}. This is because the number of reference signals that can be designed to be orthogonal in the same radio resource is decreased when the length of the applicable walsh code is shortened. The antenna port is limited to {7, 8} in FIG. 14. The walsh code used in the antenna port {7, 8} or {9, 10} may be given by the following table.

TABLE 1

| Antenna port p | [$\overline{w}_p(0)\ \overline{w}_p(1)$] |
|---|---|
| 7 | [+1 +1] |
| 8 | [−1 +1] |

TABLE 2

| Antenna port p | [$\overline{w}_p(0)\ \overline{w}_p(1)$] |
|---|---|
| 9 | [+1 +1] |
| 10 | [−1 +1] |

In the sTTI, in order to minimize an sPDSCH decoding delay caused by the restoration of the reference signal, the UE-specific reference signal in the single sTTI is sent in the same OFDM symbol, and the UE-specific reference signal is arranged, if possible, in a temporally precedent symbol in the sTTI. Therefore, a signal is transmitted by applying $\overline{w}_p(x)$ to different subcarriers of the same OFDM symbol. That is, if the antenna port is divided by multiplying the walsh code in a time-axis direction in the existing LTE system, the antenna port is divided by multiplying the walsh code in a frequency-axis direction in the present specification. This is because a time interval is shortened when the sTTI is used, and thus it becomes difficult to ensure orthogonality in a time axis. For example, as shown in FIG. 14, $\overline{w}_p(0)$ may be used in $1^{st}$, $6^{th}$, and $11^{th}$ subcarriers from the top, and $\overline{w}_p(1)$ may be used in $2^{nd}$, $7^{th}$ and $12^{th}$ subcarriers from the top.

Herein, the antenna port 7 may correspond to a first antenna, the antenna port 8 may correspond to a second antenna, [+1 +1] may correspond to a first orthogonal sequence, and [−1 +1] may correspond to a second orthogonal sequence. If so, the UE-specific reference signal includes a first reference signal sequence to which a first orthogonal sequence is applied and which is used for the first antenna, and a second reference signal sequence to which a second orthogonal sequence is applied and which is used for the second antenna. The first orthogonal sequence and the second orthogonal sequence are selected from mutually orthogonal walsh codes. In addition, at least one UE-specific reference signal is included in one symbol of each of a plurality of $1^{st}$ downlink channels. A $1^{st}$ downlink channel includes an sPDSCH received during the sTTI, and an sPDCCH for scheduling the sPDSCH. A subframe includes a cell-specific reference signal.

In the existing LTE system, the cell-specific reference signal has a resource element which changes depending on a cell ID to avoid interference with respect to a cell-specific reference signal of a neighboring cell, whereas the UE-specific reference signal is optimized to be arranged at both ends of a resource block irrespective of the cell ID to increase accuracy of channel estimation. Therefore, in order not to change a position of the resource element in which the UE-specific reference signal is arranged according to the cell ID in the sTTI, the UE-specific reference signal must not be arranged in an OFDM symbol in which the cell-specific reference signal is arranged. In addition, in order to minimize a change in the position of the UE-specific reference signal according to the length of the control region, it may include a case where the UE-specific reference signal is not arranged in 3 OFDM symbols temporally precedent in a corresponding subframe.

In the existing LTE system, the cell-specific reference signal has a resource element which changes depending on a cell ID to avoid interference with respect to a cell-specific reference signal of a neighboring cell, whereas the UE-specific reference signal is optimized to be arranged at both ends of a resource block irrespective of the cell ID to increase accuracy of channel estimation. Therefore, in order not to change a position of the resource element in which the UE-specific reference signal is arranged according to the cell ID in the sTTI, the UE-specific reference signal must not be arranged in an OFDM symbol in which the cell-specific reference signal is arranged. In addition, in order to minimize a change in the position of the UE-specific reference signal according to the length of the control region, it may include a case where the UE-specific reference signal is not arranged in 3 OFDM symbols temporally precedent in a corresponding subframe.

In FIG. 14, the UE-specific reference signal may be defined as follows.

When a frequency index of a physical resource block (PRB) allocated for transmission of the PDSCH is $n_{PRB}$ and an aTTI index is $n_{sTTI}$ ($0 \leq n_{sTTI} \leq M$), a reference signal symbol $a_{k,l}^{(p)}$ allocated to the antenna ports 7 and 8 is given as follows from a reference signal sequence r(m) (the following equation is expressed basically according to 3GPP TS36.211).

$$a_{k,l}^{(p)} = w_p(m') \cdot r(6 \cdot l' \cdot N_{RB}^{max,DL} + 6 \cdot n_{PRB} + m') \quad \text{[Equation 1]}$$

Herein, $w_p(i)$ is as follows.

$$w_p(i) = \overline{w}_{(p+n_{PRB})\bmod 2}(i) \quad \text{[Equation 2]}$$

$$k = m' \bmod 2 + N_{sc}^{RB} n_{PRB} + k'$$

$$k' = \begin{cases} 0 & \text{if } m' = 0 \text{ or } 1 \\ 5 & \text{if } m' = 2 \text{ or } 3 \\ 10 & \text{if } m' = 4 \text{ or } 5 \end{cases}$$

$$l = \begin{cases} 3 & \text{if } n_s \bmod 2 = 0 \text{ and } l' = 0 \\ 6 & \text{if } n_s \bmod 2 = 0 \text{ and } l' = 1 \\ 2 & \text{if } n_s \bmod 2 = 1 \text{ and } l' = 2 \\ 5 & \text{if } n_s \bmod 2 = 1 \text{ and } l' = 3 \end{cases}$$

$$l' = n_{sTTI}$$

$$m' = 0, 1, 2, 3, 4, 5$$

Herein, $\overline{w}_z(i)$ is as follows.

Equation 3

| Index z | [$\overline{w}_z(0)\ \overline{w}_z(1)\ \overline{w}_z(2)\ \overline{w}_z(3)\ \overline{w}_z(4)\ \overline{w}_z(5)$] |
|---|---|
| 0 | [+1 +1 −1 +1 +1 +1] |
| 1 | [−1 +1 +1 +1 −1 +1] |

In the above example, $\overline{w}_z(i)$ to be applied is different according to $n_{PRB}$ in the same antenna port in order to minimize an increase in a peak to average power ratio (PAPR) caused by repetition of the same symbol. In FIG. 14, an antenna layer may be divided by sequentially multiplying $\overline{w}_z(0)\ \overline{w}_z(1)\ \overline{w}_z(2)\ \overline{w}_z(3)\ \overline{w}_z(4)\ \overline{w}_z(5)$ from the top respectively to $1^{st}$, $2^{nd}$, $6^{th}$, $7^{th}$, $11^{th}$, and $12^{th}$ subcarriers from the top.

Herein, the antenna port 7 may correspond to a first antenna, the antenna port 8 may correspond to a second antenna, [+1 +1 −1 +1 +1 +1] may correspond to a first orthogonal sequence, and [−1 +1 +1 +1 −1 +1] may correspond to a second orthogonal sequence. If so, the UE-specific reference signal includes a first reference signal sequence to which a first orthogonal sequence is applied and which is used for the first antenna, and a second reference signal sequence to which a second orthogonal sequence is applied and which is used for the second antenna. The first orthogonal sequence and the second orthogonal sequence are selected from mutually orthogonal walsh codes. In addition, at least one UE-specific reference signal is included in one symbol of each of a plurality of $1^{st}$ downlink channels. A $1^{st}$ downlink channel includes an sPDSCH received during the sTTI, and an sPDCCH for scheduling the sPDSCH. A subframe includes a cell-specific reference signal.

Figure 15:
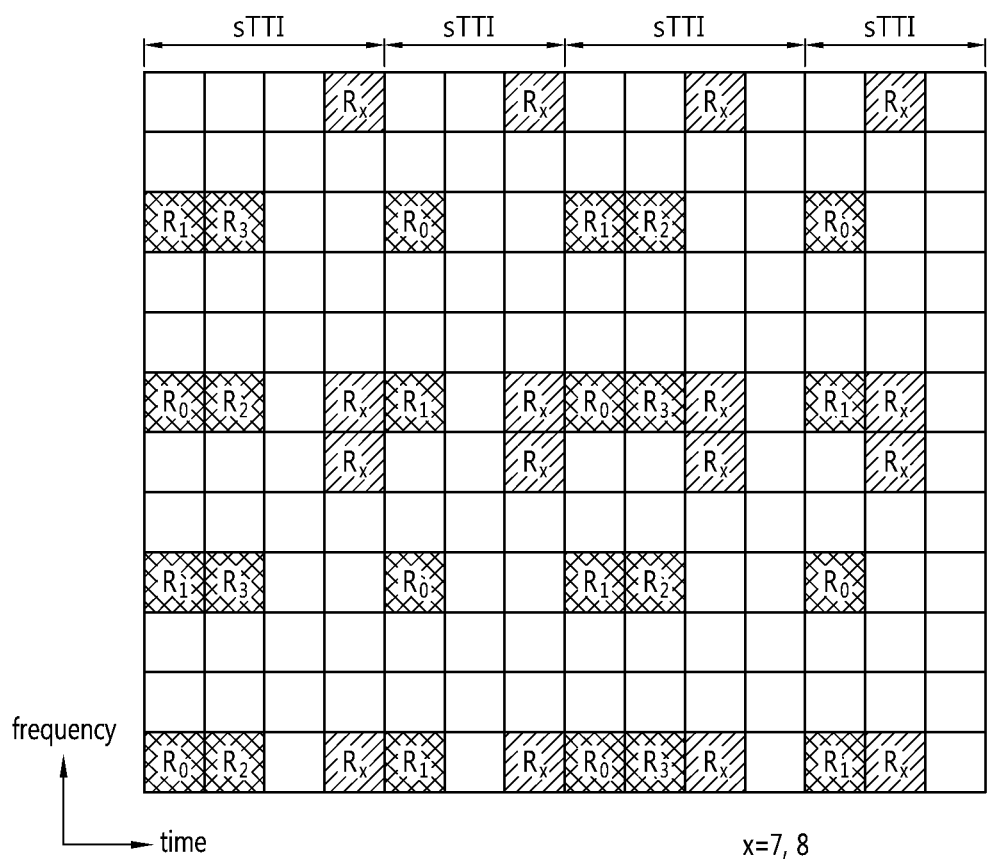
FIG. 15 shows another embodiment of an arrangement of a UE-specific reference signal for an sTTI.

FIG. 15 shows another embodiment of an arrangement of a UE-specific reference signal for an sTTI.

When a frequency index of a physical resource block (PRB) allocated for transmission of the PDSCH is $n_{PRB}$ and an sTTI index is $n_{sTTI}(0 \leq n_{sTTI} \leq M)$, a reference signal symbol $a_{k,l}^{(p)}$ allocated to the antenna ports 7 and 8 is given as follows from a reference signal sequence r(m) (the following equation is expressed basically according to 3GPP TS36.211).

$$a_{k,l}^{(p)} = w_p(m') \cdot r(4 \cdot l' \cdot N_{RB}^{max,DL} + 4 \cdot n_{PRB} + m')$$ [Equation 3]

Herein, $w_p(i)$ is as follows.

$$w_p(i) = \overline{w}_{(p+n_{PRB}) \bmod 4}(i)$$ [Equation 4]

$$k = 5(m' \bmod 2) + N_{sc}^{RB} n_{PRB} + k'$$

$$k' = \begin{cases} 0 & \text{if } m' = 0 \text{ or } 1 \\ 6 & \text{if } m' = 2 \text{ or } 3 \end{cases}$$

$$l = \begin{cases} 3 & \text{if } n_s \bmod 2 = 0 \text{ and } l' = 0 \\ 6 & \text{if } n_s \bmod 2 = 0 \text{ and } l' = 1 \\ 2 & \text{if } n_s \bmod 2 = 1 \text{ and } l' = 2 \\ 5 & \text{if } n_s \bmod 2 = 1 \text{ and } l' = 3 \end{cases}$$

$$l' = n_{sTTI}$$
$$m' = 0, 1, 2, 3$$

Herein, $\overline{w}_z(i)$ is as follows.

TABLE 4

| Index z | [$\overline{w}_z(0)$ $\overline{w}_z(1)$ $\overline{w}_z(2)$ $\overline{w}_z(3)$] |
|---|---|
| 0 | [+1 +1 +1 +1] |
| 1 | [+1 −1 +1 −1] |
| 2 | [+1 +1 −1 −1] |
| 3 | [−1 −1 +1 +1] |

In the above example, $\overline{w}_z(i)$ to be applied is different according to $n_{PRB}$ in the same antenna port in order to minimize an increase in a peak to average power ratio (PAPR) caused by repetition of the same symbol. In FIG. 14, an antenna layer may be divided by sequentially multiplying $\overline{w}_z(0)$ $\overline{w}_z(1)$ $\overline{w}_z(2)$ $\overline{w}_z(3)$ $\overline{w}_z(4)$ $\overline{w}_z(5)$ from the top respectively $1^{st}$, $2^{nd}$, $6^{th}$, $7^{th}$, $11^{th}$, and $12^{th}$ subcarriers from the top.

Herein, the antenna port 7 may correspond to a first antenna, and the antenna port 8 may correspond to a second antenna. In addition, the first orthogonal sequence and the second orthogonal sequence may be selected from mutually orthogonal walsh codes. If so, the UE-specific reference signal includes a first reference signal sequence to which a first orthogonal sequence is applied and which is used for the first antenna, and a second reference signal sequence to which a second orthogonal sequence is applied and which is used for the second antenna. In addition, at least one UE-specific reference signal is included in one symbol of each of a plurality of $1^{st}$ downlink channels. A $1^{st}$ downlink channel includes an sPDSCH received during the sTTI, and an sPDCCH for scheduling the sPDSCH. A subframe includes a cell-specific reference signal.

Figure 16:
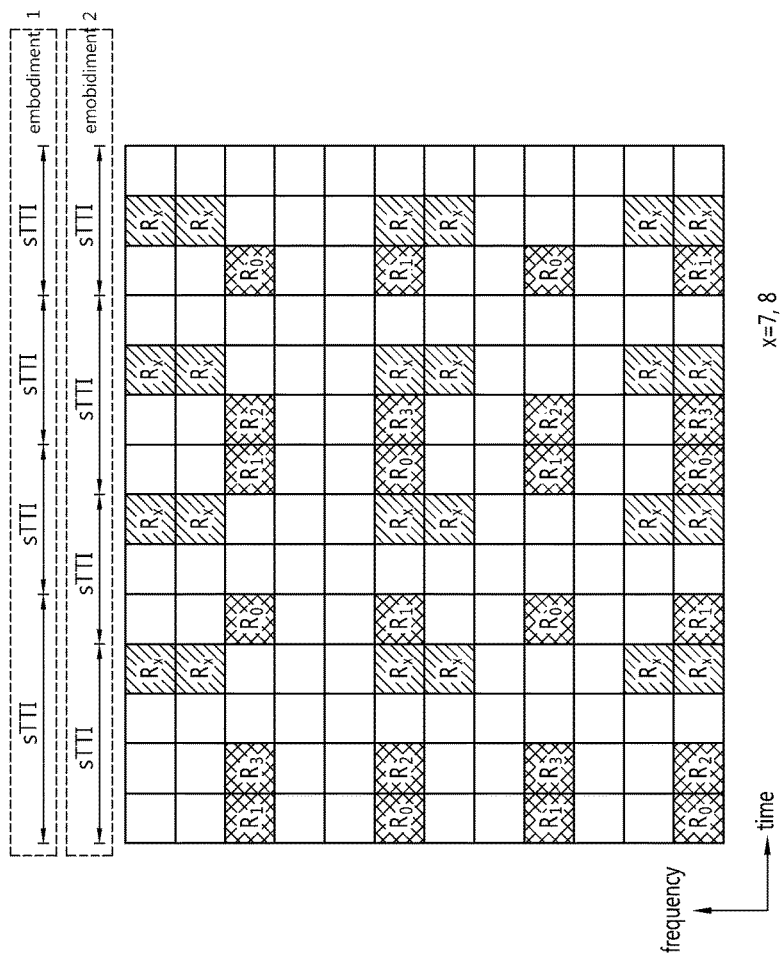
FIG. 16 shows an example of arranging a UE-specific reference signal for an embodiment 1 and an embodiment 2.

FIG. 16 shows an example of arranging a UE-specific reference signal for the embodiment 1 and the embodiment 2.

The UE-specific reference signal arrangement for the sTTI in FIG. 14 or the UE-specific reference signal arrangement for the sTTI in FIG. 15 may also directly apply to the embodiment 1 in which the $1^{st}$ sTTI has a length of 5 OFDM symbols and the embodiment 2 in which the $1^{st}$ sTTI has a length of 4 OFDM symbols as described above. FIG. 16 illustrates the UE-specific reference signal arrangement for the sTTI of FIG. 14 for example.

Herein, the antenna port 7 may correspond to a first antenna, and the antenna port 8 may correspond to a second antenna. In addition, the first orthogonal sequence and the second orthogonal sequence may be selected from mutually orthogonal walsh codes. If so, the UE-specific reference signal includes a first reference signal sequence to which a first orthogonal sequence is applied and which is used for the first antenna, and a second reference signal sequence to which a second orthogonal sequence is applied and which is used for the second antenna. In addition, at least one UE-specific reference signal is included in one symbol of each of a plurality of $1^{st}$ downlink channels. A $1^{st}$ downlink channel includes an sPDSCH received during the sTTI, and an sPDCCH for scheduling the sPDSCH. A subframe includes a cell-specific reference signal.

Figure 17:
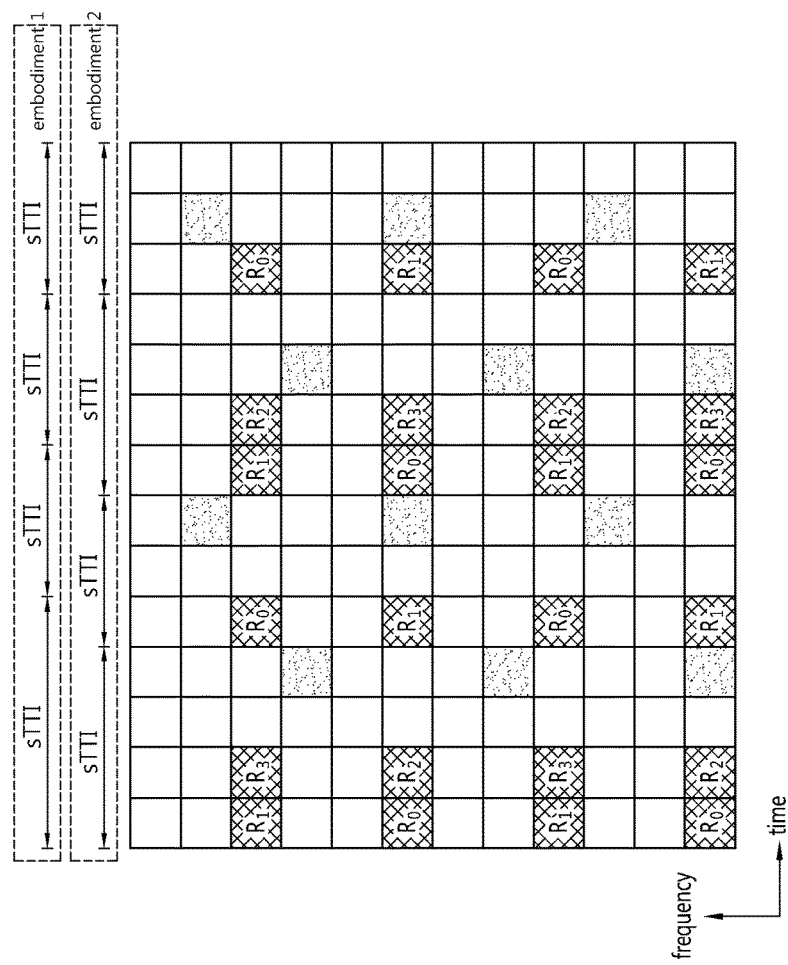
FIG. 17 shows an example of arranging a reference signal for the embodiment 1 and the embodiment 2 by utilizing an antenna port 5 in the existing LTE system.

FIG. 17 shows an example of arranging a reference signal for the embodiment 1 and the embodiment 2 by utilizing an antenna port 5 in the existing LTE system.

There may be a case where single-layer beamforming is intended to be performed instead of performing multi-layer beamforming. Likewise, in this case, it may be directly applied to the sTTI of the embodiment 1 in which the $1^{st}$ sTTI has a length of 5 OFDM symbols and the $1^{st}$ sTTI has a length of 4 OFDM symbols without having to change a position of the UE-specific reference signal of the existing antenna port 5.

Herein, the antenna port 7 may correspond to a first antenna, and the antenna port 8 may correspond to a second antenna. In addition, the first orthogonal sequence and the second orthogonal sequence may be selected from mutually orthogonal walsh codes. If so, the UE-specific reference signal includes a first reference signal sequence to which a first orthogonal sequence is applied and which is used for the first antenna, and a second reference signal sequence to which a second orthogonal sequence is applied and which is used for the second antenna. In addition, at least one UE-specific reference signal is included in one symbol of each of a plurality of $1^{st}$ downlink channels. A $1^{st}$ downlink channel includes an sPDSCH received during the sTTI, and an sPDCCH for scheduling the sPDSCH. A subframe includes a cell-specific reference signal.

Figure 18:
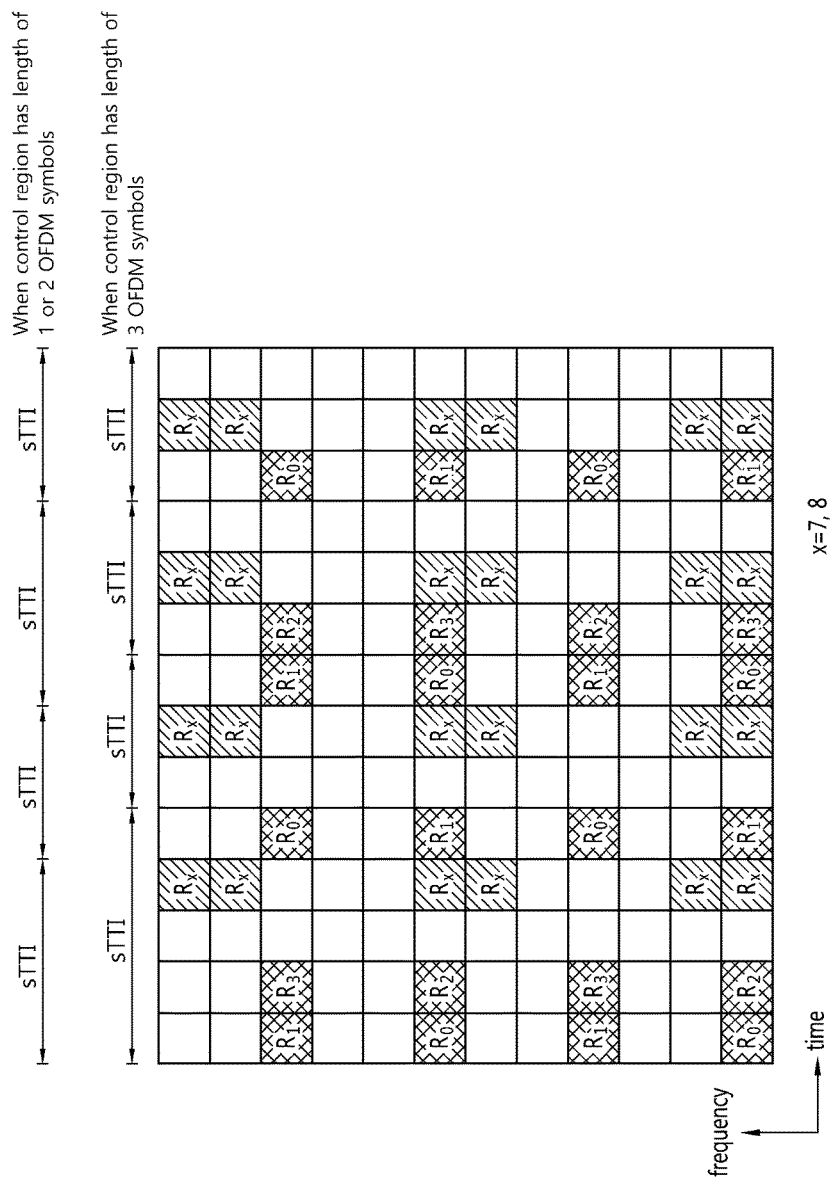
FIG. 18 shows an example of arranging a UE-specific reference signal for an embodiment 3.

FIG. 18 shows an example of arranging a UE-specific reference signal for the embodiment 3.

The UE-specific reference signal arrangement for the sTTI in FIG. 14 may also directly apply to the embodiment 3 in which the length of the $1^{st}$ sTTI is also changed depending on the length of the control region described above. FIG. 18 illustrates the UE-specific reference signal arrangement for the sTTI of FIG. 14 for example. In addition, if it is intended to perform single-layer beamforming without having to perform multi-layer beamforming, it may also be applied directly to the sTTI of the embodiment 3 by utilizing the reference signal arrangement of the antenna port 5 of the existing LTE system.

Herein, the antenna port 7 may correspond to a first antenna, and the antenna port 8 may correspond to a second antenna. In addition, the first orthogonal sequence and the second orthogonal sequence may be selected from mutually orthogonal walsh codes. If so, the UE-specific reference signal includes a first reference signal sequence to which a first orthogonal sequence is applied and which is used for the first antenna, and a second reference signal sequence to which a second orthogonal sequence is applied and which is used for the second antenna. In addition, at least one UE-specific reference signal is included in one symbol of each of a plurality of $1^{st}$ downlink channels. A $1^{st}$ downlink channel includes an sPDSCH received during the sTTI, and an sPDCCH for scheduling the sPDSCH. A subframe includes a cell-specific reference signal.

Figure 19:
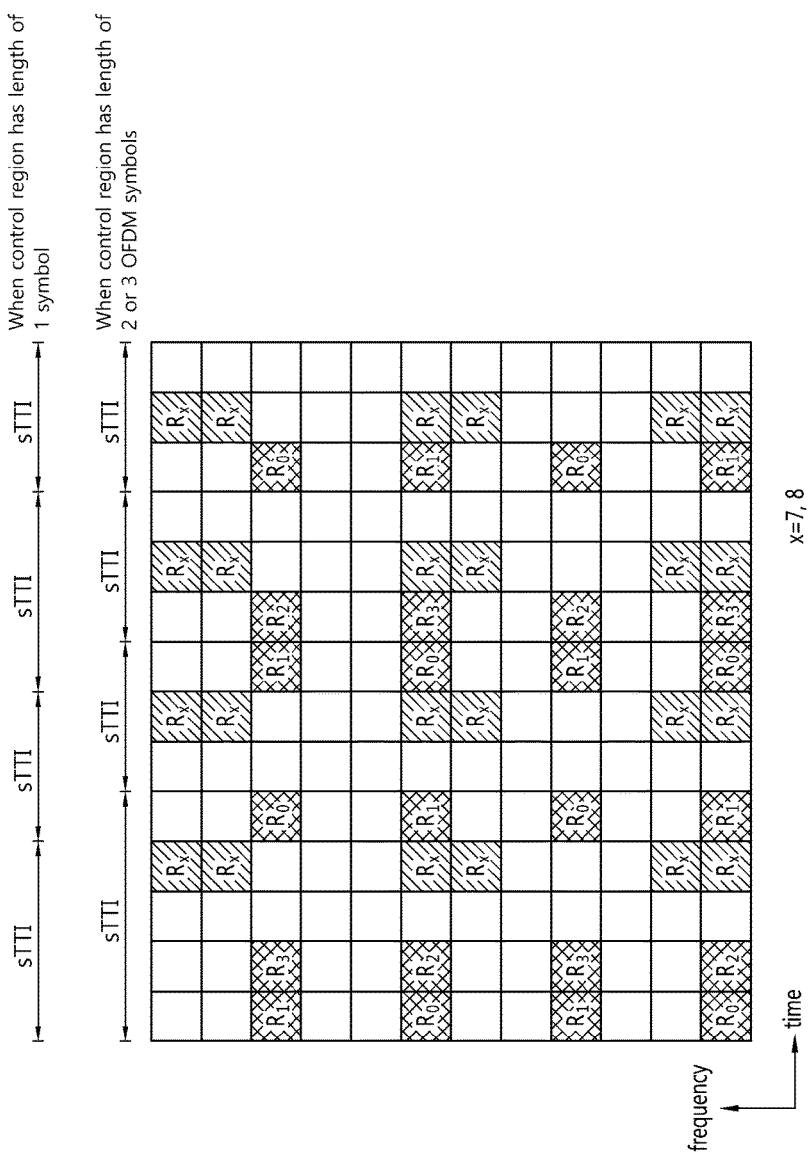
FIG. 19 shows an example of arranging a UE-specific reference signal for an embodiment 4.

FIG. 19 shows an example of arranging a UE-specific reference signal for the embodiment 4.

The UE-specific reference signal arrangement for the sTTI in FIG. 14 may also directly apply to the embodiment 4 in which the length of the $1^{st}$ sTTI is also changed depending on the length of the control region described above. FIG. 18 illustrates the UE-specific reference signal arrangement for the sTTI of FIG. 14 for example. In addition, if it is intended to perform single-layer beamforming without having to perform multi-layer beamforming, it may also be applied directly to the sTTI of the embodiment 4 by utilizing the reference signal arrangement of the antenna port 5 of the existing LTE system.

Herein, the antenna port 7 may correspond to a first antenna, and the antenna port 8 may correspond to a second antenna. In addition, the first orthogonal sequence and the second orthogonal sequence may be selected from mutually orthogonal walsh codes. If so, the UE-specific reference signal includes a first reference signal sequence to which a first orthogonal sequence is applied and which is used for the first antenna, and a second reference signal sequence to which a second orthogonal sequence is applied and which is used for the second antenna. In addition, at least one UE-specific reference signal is included in one symbol of each of a plurality of $1^{st}$ downlink channels. A $1^{st}$ downlink channel includes an sPDSCH received during the sTTI, and an sPDCCH for scheduling the sPDSCH. A subframe includes a cell-specific reference signal.

Figure 20:
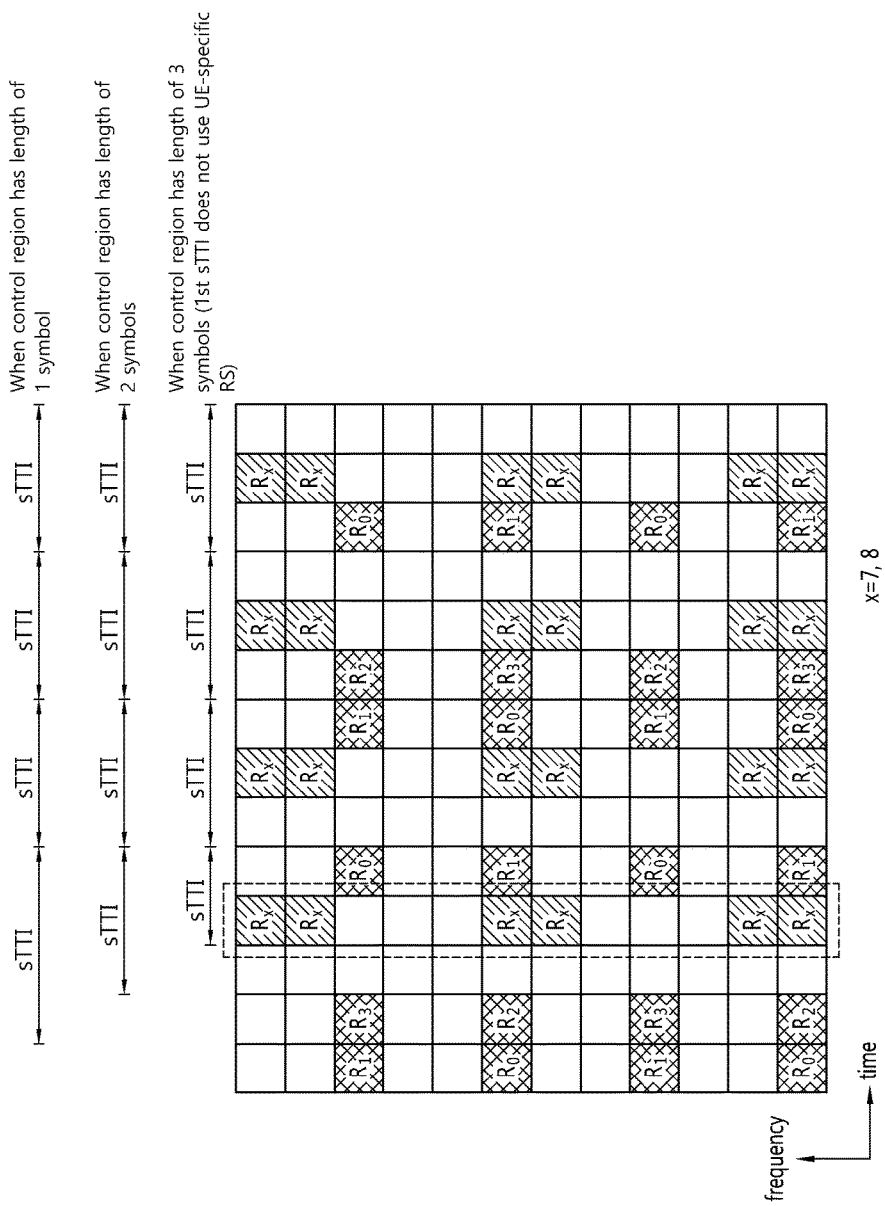
FIG. 20 shows an example of arranging a UE-specific reference signal for an embodiment 5.

FIG. 20 shows an example of arranging a UE-specific reference signal for the embodiment 5.

It is examined whether the UE-specific reference signal arrangement for the sTTI in FIG. 14 can be directly applied to the sTTI of the embodiment 5 in which the $1^{st}$ sTTI has a specific symbol as described above. If a control region has a length of 1 or 2 OFDM symbols, the above description may be directly applied. However, if the control region has a length of 3 OFDM symbols, the UE-specific reference signal is not used in the $1^{st}$ sTTI. This is because the UE-specific reference signal cannot be arranged in a corresponding OFDM symbol since a temporally first precedent symbol of the $1^{st}$ sTTI is a special symbol. Even if the UE-specific reference signal is arranged in a $2^{nd}$ OFDM symbol, it is not preferable since an overhead of a reference signal becomes excessively large. In FIG. 20, a dotted line indicates that the $1^{st}$ sTTI does not use the UE-specific reference signal when the control region has the length of 3 OFDM symbols.

Herein, the antenna port 7 may correspond to a first antenna, and the antenna port 8 may correspond to a second antenna. In addition, the first orthogonal sequence and the second orthogonal sequence may be selected from mutually orthogonal walsh codes. If so, the UE-specific reference signal includes a first reference signal sequence to which a first orthogonal sequence is applied and which is used for the first antenna, and a second reference signal sequence to which a second orthogonal sequence is applied and which is used for the second antenna. In addition, at least one UE-specific reference signal is included in one symbol of each of a plurality of $1^{st}$ downlink channels. A $1^{st}$ downlink channel includes an sPDSCH received during the sTTI, and an sPDCCH for scheduling the sPDSCH. A subframe includes a cell-specific reference signal.

Figure 21:
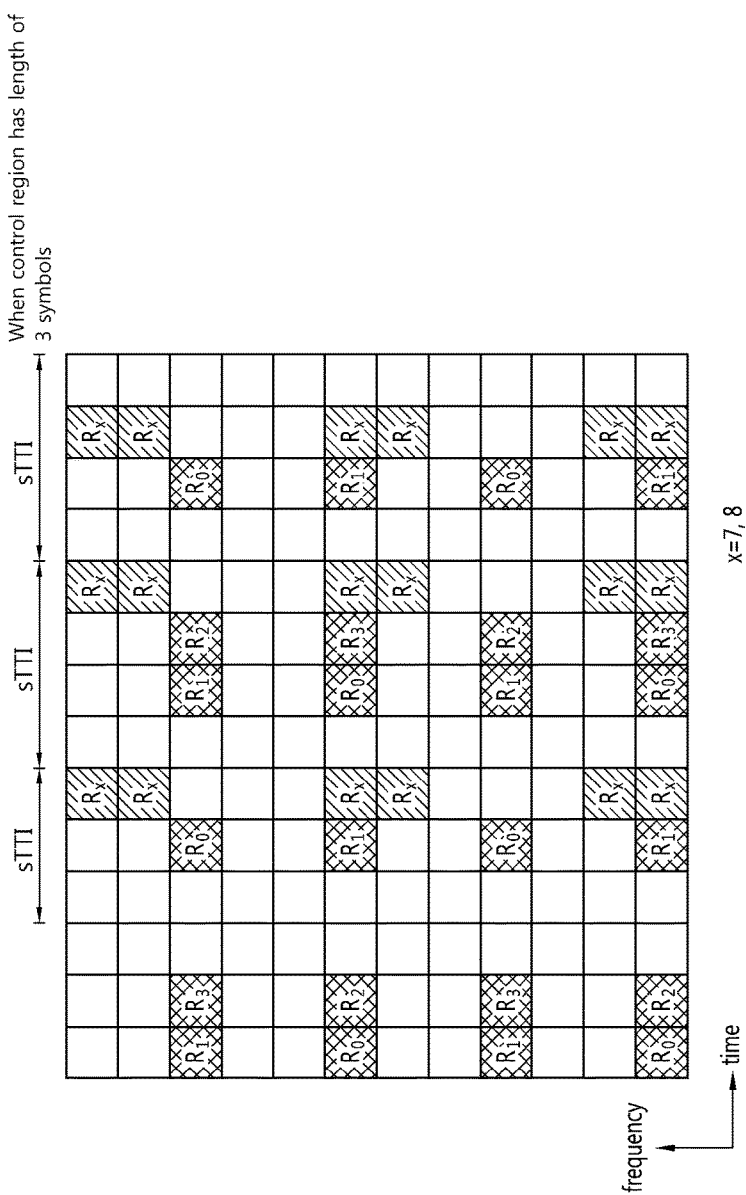
FIG. 21 shows an example of arranging a UE-specific reference signal when a control region has a length of 3 OFDM symbols in an embodiment 6.

FIG. 21 shows an example of arranging a UE-specific reference signal when a control region has a length of 3 OFDM symbols in the embodiment 6.

It is examined whether the UE-specific reference signal arrangement for the sTTI in FIG. 14 can be directly applied to the sTTI of the embodiment 6 in which the $1^{st}$ sTTI has a specific symbol as described above and the number of sTTIs in the existing TTI is changed. If a control region has a length of 1 or 2 OFDM symbols, the above description may be directly applied. However, if the control region has the length of 3 OFDM symbols, since the number of sTTIs in the existing TTI is changed from 4 to 3, the UE-specific reference signal must be arranged properly as shown in FIG. 21. Herein, the UE-specific reference signal is also arranged in the $1^{st}$ sTTI unlike in the case where the control region has the length of 3 OFDM symbols in FIG. 20.

Herein, the antenna port 7 may correspond to a first antenna, and the antenna port 8 may correspond to a second antenna. In addition, the first orthogonal sequence and the second orthogonal sequence may be selected from mutually orthogonal walsh codes. If so, the UE-specific reference signal includes a first reference signal sequence to which a first orthogonal sequence is applied and which is used for the first antenna, and a second reference signal sequence to which a second orthogonal sequence is applied and which is used for the second antenna. In addition, at least one UE-specific reference signal is included in one symbol of each of a plurality of $1^{st}$ downlink channels. A $1^{st}$ downlink channel includes an sPDSCH received during the sTTI, and an sPDCCH for scheduling the sPDSCH. A subframe includes a cell-specific reference signal.

Figure 22:
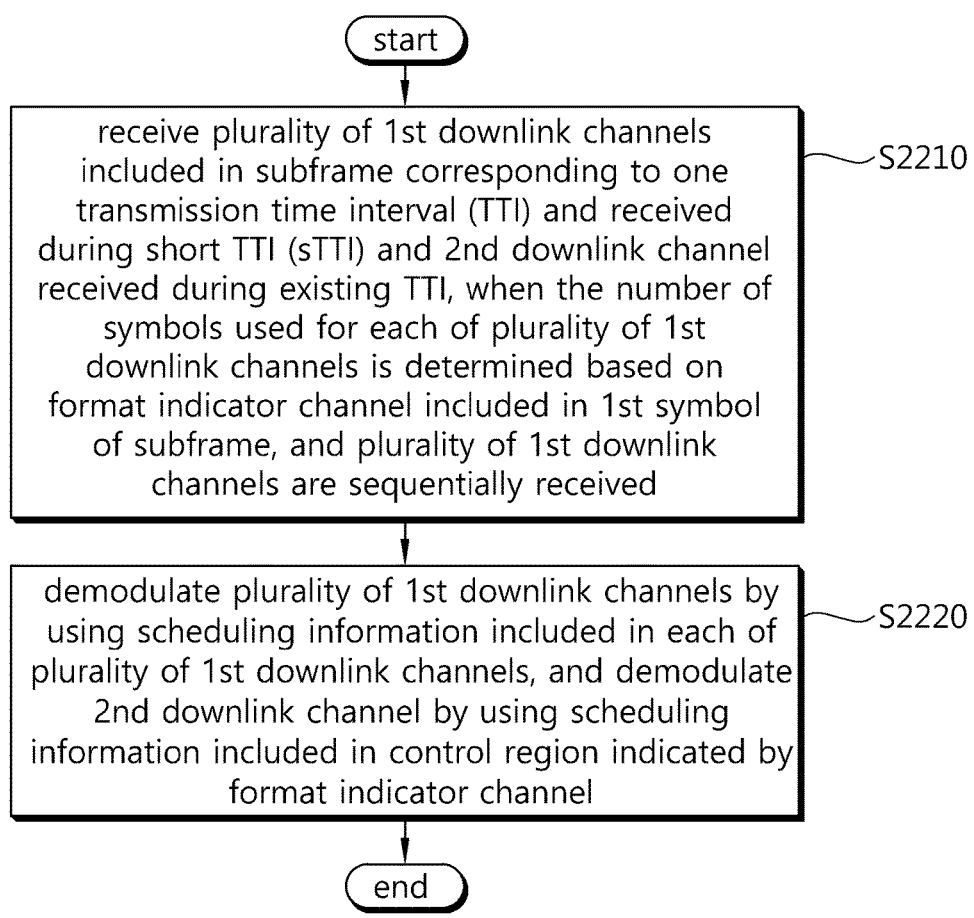
FIG. 22 is a flowchart illustrating steps of a method of performing communication by arranging a subframe structure of a short TTI depending on a change in a control region.

FIG. 22 is a flowchart illustrating steps of a method of performing communication by arranging a subframe structure of a short TTI depending on a change in a control region.

Hereinafter, the sTTI is in the existing TTI and corresponds to a time interval temporally shorter than the existing TTI. A $1^{st}$ downlink channel includes sPDSCH received during the sTTI and sPDCCH for scheduling the sPDSCH. A $2^{nd}$ downlink channel corresponds to the existing PDSCH received during the existing TTI. Channel demodulation corresponds to channel decoding.

Referring to FIG. 22, in step S2210, a plurality of $1^{st}$ downlink channels included in a subframe corresponding to one existing TTI and received during the sTTI and a $2^{nd}$ downlink channel received during the existing TTI are received. The number of symbols used for each of the plurality of $1^{st}$ downlink channels is determined on the basis of a format indicator channel included in a $1^{st}$ symbol of the subframe. Herein, the format indicator channel corresponds to a PCFICH. The $1^{st}$ symbol of the subframe is included in a control region of the existing TTI, and the $1^{st}$ symbol is when the PCFICH is arranged first in the control region of the existing TTI. Since a size of the control region of the existing TTI can be known by demodulating the PCFICH, the number of symbols used for each of the plurality of $1^{st}$ downlink channels can also be known. In addition, the plurality of $1^{st}$ downlink channels are sequentially received. That is, they are received in order of a $1^{st}$ sTTI, a $2^{nd}$ sTTI, and a $3^{rd}$ sTTI.

In step S2220, the plurality of $1^{st}$ downlink channels are demodulated by using the scheduling information included in each of the plurality of $1^{st}$ downlink channels. The scheduling information included in each of the plurality of $1^{st}$ downlink channels corresponds to control information for scheduling the sPDSCH in each sTTI. The control information is included in the sPDCCH in each sTTI. In addition, the $2^{nd}$ downlink channel is demodulated by using the scheduling information included in the control region indicated by the format indicator channel. The control region indicated by the format indicator channel corresponds to the control region of the existing TTI, and the scheduling information included in the control region is included in the existing PDCCH. That is, this corresponds to demodulation of the existing PDSCH by using the existing PDCCH.

Figure 23:
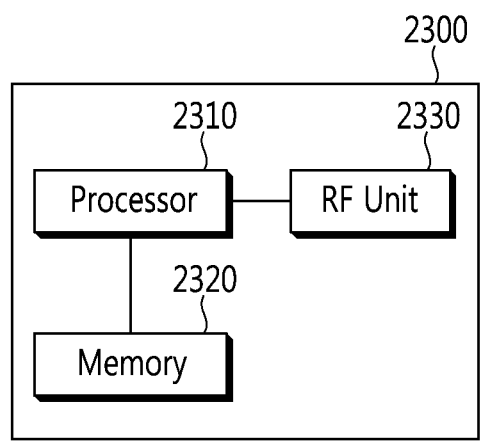
FIG. 23 is a block diagram showing an apparatus for wireless communication for implementing an embodiment of the present invention.

FIG. 23 is a block diagram showing an apparatus for wireless communication for implementing an embodiment of the present invention.

An apparatus 2300 for wireless communication includes a processor 2310, a memory 2320 and a radio frequency (RF) unit 2330.

The processor 2310 may be configured to implement proposed functions, procedures and/or methods described in this description. Layers of the radio interface protocol may be implemented in the processor 2310. The processor 2310 may handle a procedure explained above. The memory 2320 is operatively coupled with the processor 2310, and the RF unit 2330 is operatively coupled with the processor 2310.

The processor 2310 may include application-specific integrated circuit (ASIC), other chipset, logic circuit and/or data processing device. The memory 2320 may include read-only memory (ROM), random access memory (RAM), flash memory, memory card, storage medium and/or other storage device. The RF unit 2330 may include baseband circuitry to process radio frequency signals. When the embodiments are implemented in software, the techniques described herein can be implemented with modules (e.g., procedures, functions, and so on) that perform the functions described herein. The modules can be stored in memory 2320 and executed by processor 2310. The memory 2320 can be implemented within the processor 2310 or external to the processor 2310 in which case those can be communicatively coupled to the processor 2310 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

Furthermore, the technical concepts in the described embodiments may be identically applied, and embodiments in which the number of subframes and the number of special symbols within a radio frame are differently defined may be included in the technical scope of this specification.

What is claimed is:

1. A method of performing communication by using a plurality of control channels and a plurality of data channels delivered through a plurality of symbols in a wireless communication system, the method comprising:
receiving a plurality of first downlink channels comprised in a subframe corresponding to one transmission time interval (TTI) and received during a short TTI (sTTI), and receiving a second downlink channel received during the TTI, wherein the number of symbols used for each of the plurality of first downlink channels is determined on the basis of a format indicator channel comprised in a first symbol of the subframe and the plurality of first downlink channels are sequentially received; and
demodulating the plurality of first downlink channels by using scheduling information comprised in each of the plurality of first downlink channels, and demodulating the second downlink channel by using scheduling information comprised in a control region indicated by the format indicator channel.

2. The method of claim 1, wherein each of the plurality of first downlink channels comprises a short physical downlink shared channel (sPDSCH), the second downlink channel comprises a physical downlink shared channel (PDSCH), a first symbol of each of the plurality of first downlink channels comprises a short physical downlink control channel (sPDCCH) for the sPDSCH, and a control region of the second downlink channel comprises a PDCCH for the PDSCH.

3. The method of claim 2, wherein the number of symbols used for each of the plurality of first downlink channels is determined on the basis of the number of symbols used in the control region.

4. The method of claim 2, wherein the sPDSCH and the PDSCH are received in different frequency bands.

5. The method of claim 1, wherein the scheduling information comprised in each of the plurality of first downlink channels is comprised in a first symbol of the plurality of first downlink channels.

6. The method of claim 1, wherein the scheduling information for the first downlink channel received first among the plurality of first downlink channels is comprised in the control region.

7. The method of claim 1, wherein the symbol is an orthogonal frequency division multiplexing (OFDM) symbol or a single-carrier frequency division multiple access (SC-FDMA) symbol.

8. The method of claim 1, wherein a user specific (UE)-reference signal (RS) is comprised only in one symbol of each of the plurality of first downlink channels.

9. The method of claim 8, wherein the UE-specific RS comprises a first RS sequence to which a first orthogonal sequence is applied and which is used for a first antenna, and a second RS sequence to which a second orthogonal sequence is applied and which is used for a second antenna.

10. The method of claim 9, wherein the first orthogonal sequence and the second orthogonal sequence are selected from among mutually orthogonal walsh codes.

11. A user equipment (UE) for performing communication by using a plurality of control channels and a plurality of data channels delivered through a plurality of symbols in a wireless communication system, the UE comprises:

a radio frequency (RF) unit for transmitting and receiving a radio signal; and a processor operatively coupled to the RF unit, wherein the processor is configured to:

receive a plurality of first downlink channels comprised in a subframe corresponding to one transmission time interval (TTI) and received during a short TTI (sTTI), and receive a second downlink channel received during the TTI, wherein the number of symbols used for each of the plurality of first downlink channels is determined on the basis of a format indicator channel comprised in a first symbol of the subframe and the plurality of first downlink channels are sequentially received; and demodulate the plurality of first downlink channels by using scheduling information comprised in each of the plurality of first downlink channels, and demodulate the second downlink channel by using scheduling information comprised in a control region indicated by the format indicator channel.

\* \* \* \* \*